(12) United States Patent
McDaniel et al.

(10) Patent No.: US 10,539,937 B2
(45) Date of Patent: Jan. 21, 2020

(54) ENVIRONMENTAL CONTROL MANAGEMENT SYSTEM

(71) Applicant: Ideal Impact, Inc., Grapevine, TX (US)

(72) Inventors: Wesley O. McDaniel, Grapevine, TX (US); Todd A. Porter, North Richland Hills, TX (US); Kimberly J. Hornback, McKinney, TX (US)

(73) Assignee: IDEAL IMPACT, INC., Grapevine, TX (US)

( * ) Notice: Subject to any disclaimer, the term of this patent is extended or adjusted under 35 U.S.C. 154(b) by 55 days.

(21) Appl. No.: 15/928,408

(22) Filed: Mar. 22, 2018

(65) Prior Publication Data

US 2018/0284819 A1 Oct. 4, 2018

Related U.S. Application Data

(60) Provisional application No. 62/479,989, filed on Mar. 31, 2017.

(51) Int. Cl.
| | |
|---|---|
| *G05B 15/02* | (2006.01) |
| *G05D 23/19* | (2006.01) |
| *G06Q 10/10* | (2012.01) |
| *G06F 16/951* | (2019.01) |
| *F24F 11/64* | (2018.01) |
| *F24F 130/10* | (2018.01) |

(52) U.S. Cl.
CPC .............. *G05B 15/02* (2013.01); *F24F 11/64* (2018.01); *G05D 23/1934* (2013.01); *G06F 16/951* (2019.01); *G06Q 10/1093* (2013.01); *F24F 2130/10* (2018.01); *G05B 2219/2642* (2013.01)

(58) Field of Classification Search
CPC .......... G05B 15/02; G05B 2219/25011; G05B 2219/25168; G05B 2219/2639; G05B 2219/2642; G05D 23/1934; G06Q 10/1093; F24F 11/64; F24F 2130/10; G06F 16/951; G06F 17/30864
See application file for complete search history.

(56) References Cited

U.S. PATENT DOCUMENTS

| | | | | |
|---|---|---|---|---|
| 6,894,707 | B2 * | 5/2005 | Nemoto | A61B 6/032 345/184 |
| 8,498,954 | B2 * | 7/2013 | Malov | G06Q 30/0201 706/45 |
| 8,556,188 | B2 * | 10/2013 | Steinberg | F24F 11/30 236/51 |
| 8,577,822 | B2 | 11/2013 | Kusiak et al. | |
| 8,788,448 | B2 | 7/2014 | Fadell et al. | |

(Continued)

OTHER PUBLICATIONS

Co-Pending PCT Application PCT/US1823724, International Search Report and Written Opinion dated Jun. 25, 2018, 8 pgs.

(Continued)

*Primary Examiner* — Chun Cao
(74) *Attorney, Agent, or Firm* — Foley & Lardner LLP

(57) ABSTRACT

Disclosed is a system and method for environmental control management. In response to a controller, sensors and effectors throughout a physical site operate to maintain the temperature, humidity, and/or peak energy usage of the physical site within parameters selected for occupant comfort and economical operation while accommodating changing occupancy patterns.

10 Claims, 28 Drawing Sheets

(56) References Cited

U.S. PATENT DOCUMENTS

| | | |
|---|---|---|
| 9,170,574 B2 | 10/2015 | Fuller et al. |
| 9,366,451 B2 | 6/2016 | Guo et al. |
| 2010/0025483 A1 | 2/2010 | Hoeynck et al. |
| 2010/0077241 A1* | 3/2010 | Piazza ................... G06F 1/3209 713/320 |
| 2012/0065789 A1 | 3/2012 | Scelzi et al. |
| 2012/0165993 A1* | 6/2012 | Whitehouse ....... G05D 23/1904 700/278 |
| 2013/0184892 A1 | 7/2013 | Mohan et al. |
| 2014/0031992 A1* | 1/2014 | Bergman ................. F24F 11/00 700/276 |
| 2014/0067150 A1 | 3/2014 | Songkakul et al. |
| 2014/0312128 A1 | 10/2014 | Matsuoka et al. |
| 2014/0316582 A1* | 10/2014 | Berg-Sonne ........... G05B 15/02 700/276 |
| 2015/0178865 A1 | 6/2015 | Anderson et al. |
| 2015/0316286 A1* | 11/2015 | Roher ..................... F24F 11/30 700/276 |
| 2016/0010878 A1 | 1/2016 | Lee et al. |
| 2016/0139575 A1 | 5/2016 | Funes |
| 2016/0187899 A1 | 6/2016 | Lee et al. |
| 2016/0203036 A1 | 7/2016 | Mezic et al. |
| 2016/0377307 A1 | 12/2016 | Fadell et al. |
| 2017/0045864 A1 | 2/2017 | Fadell et al. |
| 2018/0081378 A1* | 3/2018 | Moore ..................... F24F 11/30 |

OTHER PUBLICATIONS

Donlon, Machine Learning in HVAC Controls, www.automatedbuildings.com, Jun. 2016.

Edwards, et al., Predicting Future Hourly Residential Electrical Consumption: A Machine Learning Case Study, Energy and Buildings, 2012.

Latterner, Applying Machine Learning to Energy Usage, Division of Science and Mathematics, University of Minnesota, 2014.

Narayanaswamy, et al., Data Driven Investigation of Faults in HVAC Systems with Model, Cluster and Compare (MCC), BuildSys '14, Nov. 6, 2014.

Seem, Using Intelligent Data Analysis to Detect Abnormal Energy Consumption in Buildings, Energy and Buildings 39 (2007) 52-58, 2007.

Wu, et al., Improving Efficiency and Reliability of Building Systems Using Machien Learning and Automated Online Evaluation, School of Engineering and Applied Science, Columbia University, May 4, 2012.

* cited by examiner

ZONING MAP

| LEGEND | |
|---|---|
| (T) | THERMOSTAT |
| (S) | TEMPERATURE |
| (e) | ELECTRIC METER |
| (g) | GAS METER |
| VAV | VARIABLE AIR VOLUME |
| FPB | FAN-POWERED BOX |
| MZ | MULTI-ZONE |
| SS | SPLIT-SYSTEM |
| RTU | ROOF-TOP UNIT |

ENVIRONMENTAL CONTROL MANAGEMENT SYSTEM

CROSS-REFERENCE TO RELATED APPLICATION

This application claims priority to, and the benefit of, U.S. Provisional Patent Application Ser. No. 62/479,989 entitled "ENVIRONMENTAL CONTROL MANAGEMENT SYSTEM" filed on Mar. 31, 2017, the contents of which are hereby incorporated herein by reference in their entirety for any purpose.

FIELD

The present disclosure relates generally to a platform for providing control system management such as for environmental control systems for buildings and for providing energy usage regulation such as to limit demand peaks of environmental control systems for buildings.

BACKGROUND

The statements in this section merely provide background information related to the present disclosure and may not constitute prior art. Frequently building operators desire to control heating, cooling, and/or other environmental systems to condition different rooms of a building at different times for occupant comfort. However, adjustment of environmental control system set points requires repetitive interactions with the environmental control system and often results in exceeding desired demand peak limits, causing high energy usage due to the overlapping operation of multiple environmental control system units, such as multiple HVAC units, as well as causing unwanted system errors, such as operation of central plant units at less than minimum load limits.

SUMMARY

An environmental control management system is provided. The environmental control management system may be configured to provide environmental control management for an environmental control management system associated with a plurality of controlled sites. The environmental control management system may include a static data store, a dynamic user data store, and a controller. The static data store may include a site intelligence database, which may include a meter demand target associated with meters providing power to effectors dispersed through the plurality of controlled sites, and an equipment intelligence database having a set points table (or seasonal values table) including environmental characteristics associated with each of the plurality of effectors. In various embodiments, the dynamic user data store may include a calendar activity database configured to store an occupancy pattern of the plurality of controlled sites. In various instances, the controller is configured to receive the occupancy pattern from the calendar activity database and schedule operation of each of the plurality of effectors in response to the occupancy pattern. Finally, the controller may also have a run time, ramp time, and load rolling engine configured to alter the schedule in response to the meter demand target whereby an electrical load associated with at least a subset of the plurality of effectors is maintained below the meter demand target.

A method of environmental control management by an environmental control management system configured to provide environmental control management for at least one of a plurality of controlled sites is provided. The method may include importing data representative of a calendar containing a plurality of calendar events, by a calendar activity engine of a controller, wherein the data includes at least one of dates, times, use types, and rooms, assigning, by a run time, ramp time, and load rolling engine of the controller, a ramp time to each calendar event, and instructing, by the controller, an effector to actuate in response to the ramp time assigned to the calendar event. Actuating may include at least one of turning on, turning off, increasing power, and decreasing power.

In various embodiments, importing the calendar includes receiving, by the calendar activity engine of the controller from a third-part data source, data representative of the calendar, and storing, by the calendar activity engine, the data representative of the calendar in a calendar activity database of a dynamic user data store.

In various embodiments, assigning the ramp time includes storing the ramp time in a ramp-to-date table of an equipment intelligence database of a static data store, and combining, by the run time, ramp time, and load rolling engine, the ramp time with seasonal ramp offsets retrieved from a comfort preferences database of a dynamic user data store.

In various embodiments, the method also includes calculating, by the calendar activity engine, an event proximity window including a determined duration of time wherein events spaced apart by no less than the event proximity window are mergeable as a single event, merging, by the calendar activity engine, at least two calendar events of the plurality of calendar events, in response to the at least two calendar events occupying time slots lying within the event proximity window, and identifying, by an equipment intelligence engine of the controller, at least one effector of a plurality of effectors of the environmental control management system, wherein the at least one effector is associated with a site of the calendar event. The method may also include determining, by the equipment intelligence engine of the controller, whether at least one further effector of the plurality of effectors of the environmental control management system has a central plant-peripheral unit relationship wherein the further effector is associated with a central plant shared with the at least one effector, in response to the determining indicating that the effector and the further effector each have central plant-peripheral unit relationships with the central plant, aggregating a load of the effector and the further effector to calculate an aggregated plant load, and in response to the determining indicating that the aggregated plant load is less than a central plant minimum load requirement, selecting by the controller a second further effector for actuating and instructing, by the controller the second further effector to actuate.

In various embodiments, the method includes identifying, by a site intelligence engine and effector mapping engine, a meter associated with the effector, evaluating a meter charge profile associated with the meter and stored in a site intelligence database by the site intelligence engine to determine an existence of a demand charge of the meter charge profile, performing a load rolling method in response to the existence of the demand charge, wherein the load rolling method returns a timeslot precession instruction, and subsequent to the performing the load rolling method, setting an operating time of at least one of the at least one effector and the central plant in response to the timeslot precession instruction.

In various embodiments, the load rolling method includes accessing the calendar, wherein the calendar includes a sequence of time slots, wherein at least one time slot is associated with a unit start time of the effector, calculating a demand of the meter associated with the effector during the at least one time slot, in response to the demand being greater than a meter demand target, associating a second time slot earlier than the at least one time slot with the unit start time, calculating a second demand of the meter associated with the effector during the second time slot, in response to the second demand being less than or equal to the meter demand target, returning the timeslot precession instruction, and wherein the returning the timeslot precession instruction includes associating the second time slot earlier than the at least one time slot with the unit start time.

In various embodiments, the method includes wherein assigning the ramp time includes performing a method of daily weather-responsive effector ramp time determination, the method of daily weather-responsive effector ramp time determination including obtaining a mode of a thermostat, wherein obtaining the mode of the thermostat includes retrieving, by a weather database of a third party data receiver, daily weather forecast data including a forecast high temperature and a forecast low temperature, retrieving an occupied cooling set point (OCSP) (or Outside Air Cooling Enable Temperature (OACET)) of the thermostat from a set points table (or seasonal values table) of at least one of an equipment intelligence database of a static data store, retrieving an occupied heating set point (OHSP) (or Outside Air Heating Enable Temperature (OAHET)) of the thermostat from the set points table (or seasonal values table) of the equipment intelligence database of the static data store, comparing the forecast high temperature to the OCSP (or OACET) and/or to the OHSP (or OAHET), and comparing the forecast low temperature to the OCSP (or OACET) and/or to the OHSP (or OAHET). In various embodiments, the method includes in response to the forecast high temperature being less than or equal to the OCSP (or OACET) and the forecast low temperature being greater than or equal to the OHSP (or OAHET), selecting an automatic mode for the thermostat, in response to the forecast high temperature being less than or equal to the OCSP (or OACET) and the forecast low temperature being less than or equal to the OHSP (or OAHET), setting a heating mode for the thermostat, in response to the forecast high temperature being greater than or equal to the OCSP (or OACET) and the forecast low temperature being less than or equal to the OHSP (or OAHET), setting the automatic mode for the thermostat The method may include in response to the forecast high temperature being greater than or equal to the OCSP (or OACET) and the forecast low temperature being greater than or equal to the OHSP (or OAHET), setting a cooling mode for the thermostat, and in response to the mode of the thermostat being the cooling mode, performing a cooling mode ramp time establishment procedure. In various embodiments, the method includes in response to the mode of the thermostat being the heating mode, performing a heating mode ramp time establishment procedure, and in response to the mode of the thermostat being the automatic mode, performing an automatic mode ramp time establishment procedure.

In various embodiments, the heating mode ramp time establishment procedure includes selecting a current day's low forecast temperature, retrieving an OHSP (or OAHET) from the set points table (or seasonal values table) of the equipment intelligence database of the static data store, differencing the current day's low forecast temperature with the OHSP (or OAHET) to obtain a worst case forecast temperature delta, retrieving a ramp time coefficient from the equipment intelligence database of the static data store (such as, for non-limiting example, from a ramp-to-date table of the equipment intelligence database of the static data store), multiplying the ramp time coefficient by the worst case forecast temperature delta to determine a calculated heating ramp time, and comparing the calculated heating ramp time to a minimum ramp time and selecting a larger of the calculated heating time and the minimum ramp time as an adjusted heating ramp time. The method may further include, retrieving a maximum ramp time from the equipment intelligence database of the static data store, selecting a smaller of the maximum ramp time and the total ramp time as a final adjusted heating ramp time, and propagating the final adjusted heating ramp time to at least one of a central plant and the effector connected to the thermostat.

In various embodiments, the method includes wherein the cooling mode ramp time establishment procedure includes selecting a higher of a previous day's high forecast temperature and a current day's high forecast temperature, retrieving an OCSP (or OACET) from the set points table (or seasonal values table) of the equipment intelligence database of the static data store, differencing the higher of the previous day's high forecast temperature and the current day's high forecast temperature with the OCSP (or OACET) to obtain a worst case forecast temperature delta, retrieving a ramp time coefficient from the equipment intelligence database of the static data store (such as, for non-limiting example, from a ramp-to-date table of the equipment intelligence database of the static data store), multiplying the ramp time coefficient by the worst case forecast temperature delta to determine a calculated cooling ramp time, and comparing the calculated cooling ramp time to a minimum ramp time and selecting a larger of the calculated cooling time and the minimum ramp time as an adjusted cooling ramp time. The method may further include, retrieving a maximum ramp time from the equipment intelligence database of the static data store, selecting a smaller of the maximum ramp time and the total ramp time as a final adjusted cooling ramp time, and propagating the final adjusted cooling ramp time to at least one of a central plant and the effector connected to the thermostat.

In various embodiments, the method includes wherein the automatic mode ramp time establishment procedure includes retrieving a final adjusted cooling ramp time by performing the cooling mode ramp time establishment procedure, retrieving a final adjusted heating ramp time by performing the heating mode ramp time establishment procedure, selecting a higher of a previous day's high forecast temperature and a current day's high forecast temperature, comparing the selected higher temperature to the OAHET, in response to the selected higher temperature being greater than or equal to the OAHET selecting the final adjusted heating ramp time as a final adjusted automatic ramp time, in response to the selected higher temperature being less than the OAHET selecting the final adjusted cooling ramp time as a final adjusted automatic ramp time, and propagating the final adjusted automatic ramp time to at least one of a central plant and the effector connected to the thermostat.

An environmental control management system configured to provide environmental control management for a plurality of controlled sites. The environmental control management system may include a static data store including a site intelligence database including a meter demand target associated with meters providing power to a plurality of effectors dispersed through the plurality of controlled sites, and an equipment intelligence database including a set points table (or seasonal values table) including environmental characteristics associated with each effector of the plurality of effectors. The system may also have a dynamic user data store including a calendar activity database configured to store an occupancy pattern of the plurality of controlled sites, and a controller configured to receive the occupancy pattern from the calendar activity database and schedule operation of each of the plurality of effectors in response to the occupancy pattern. In various instances, the controller further includes a run time, ramp time, and load rolling engine configured to alter the schedule in response to a meter demand target whereby an electrical load associated with at least a subset of the plurality of effectors is maintained below the meter demand target.

In various embodiments, the environmental control management system further includes a third party data receiver including an I/O controller configured to receive weather data via a third party data receiver data input channel, and a weather database, wherein the I/O controller stores weather data in the weather database. In various instances the controller further includes a weather adaptation module configured to retrieve the weather data and interoperate with the run time, ramp time, and load rolling engine to assign a ramp time of the at least an effector of the at least the subset of the plurality of effectors, and the controller is configured to further alter the schedule in response to the ramp time.

In various embodiments, the third party data receiver further includes a utility provider database including a billing rule and a real-time load data, and the controller is configured to alter the schedule in response to the billing rule, whereby the meter demand target of the site intelligence database is changed in response to a comparison of the real-time load data and the billing rule.

In various embodiments, assigning the ramp time includes performing a method of daily weather-responsive effector ramp time determination including obtaining a mode of a thermostat, wherein obtaining the mode of the thermostat includes retrieving, by the weather database of a third party data receiver, daily weather forecast data including a forecast high temperature and a forecast low temperature, retrieving, from the set points table (or seasonal values table) of at least one of the equipment intelligence database of the static data store, an occupied cooling set point (OCSP) (or Outside Air Cooling Enable Temperature (OACET)) of the thermostat, retrieving, from the set points table (or seasonal values table) of at least one of the equipment intelligence database of the static data store, an occupied heating set point (OHSP) (or Outside Air Heating Enable Temperature (OAHET)) of the thermostat, comparing, by the controller, the forecast high temperature to the OCSP (or OACET) and to the OHSP (or OAHET), comparing, by the controller, the forecast low temperature to the OCSP (or OACET) and to the OHSP (or OAHET), the controller configured to, in response to the forecast high temperature being less than or equal to the OCSP (or OACET) and the forecast low temperature being greater than or equal to the OHSP (or OAHET), select an automatic mode for the thermostat, the controller configured to, in response to the forecast high temperature being less than or equal to the OCSP (or OACET) and the forecast low temperature being less than or equal to the OHSP (or OAHET), select a heating mode for the thermostat, the controller configured to, in response to the forecast high temperature being greater than or equal to the OCSP (or OACET) and the forecast low temperature being less than or equal to the OHSP (or OAHET), select the automatic mode for the thermostat, and the controller configured to, in response to the forecast high temperature being greater than or equal to the OCSP (or OACET) and the forecast low temperature being greater than or equal to the OHSP (or OAHET), select a cooling mode for the thermostat, and the controller further configured to, in response to the mode of the thermostat being the cooling mode, perform a cooling mode ramp time establishment procedure, the controller further configured to, in response to the mode of the thermostat being the heating mode, perform a heating mode ramp time establishment procedure, and the controller further configured to, in response to the mode of the thermostat being the automatic mode, perform an automatic mode ramp time establishment procedure.

In various embodiments, the environmental control management system further includes wherein the heating mode ramp time establishment procedure performed by the controller includes retrieving, from the weather database by the weather adaptation module, a current day's low forecast temperature, retrieving, from the set points table (or seasonal values table) of the equipment intelligence database of the static data store, an OHSP (or OAHET), differencing, by the controller, the current day's low forecast temperature with the OHSP (or OAHET) to obtain a worst case forecast temperature delta, retrieving, from the equipment intelligence database of the static data store (such as, for non-limiting example, from a ramp-to-date table), a ramp time coefficient, multiplying the ramp time coefficient by the worst case forecast temperature delta to determine a calculated heating ramp time, and comparing the calculated heating ramp time to a minimum ramp time and selecting a larger of the calculated heating time and the minimum ramp time as an adjusted heating ramp time. The method may further include retrieving, from the equipment intelligence database of the static data store, a maximum ramp time, selecting, by the controller, a smaller of the maximum ramp time and the total ramp time as a final adjusted heating ramp time, and propagating, by the controller, the final adjusted heating ramp time to at least one of a central plant and the effector connected to the thermostat.

The environmental control management system may further include wherein the cooling mode ramp time establishment procedure includes retrieving, from the weather database by the weather adaptation module, a previous day's high forecast temperature and a current day's high forecast temperature and selecting, by the controller, a higher of the previous day's high forecast temperature and the current day's high forecast temperature, retrieving, from the set points table (or seasonal values table) of the equipment intelligence database of the static data store, an OCSP (or OACET), differencing the higher of the previous day's high forecast temperature and the current day's high forecast temperature with the OCSP (or OACET) to obtain a worst case forecast temperature delta, retrieving, from the equipment intelligence database of the static data store (such as, for non-limiting example, from a ramp-to-date table), a ramp time coefficient, multiplying, by the controller, the ramp time coefficient by the worst case forecast temperature delta to determine a calculated cooling ramp time, and comparing the calculated cooling ramp time to a minimum ramp time and selecting a larger of the calculated cooling time and the minimum ramp time as an adjusted cooling ramp time. The method may further include, retrieving, from the equipment intelligence database of the static data store, a maximum ramp time, and selecting, by the controller, a smaller of the maximum ramp time and the total ramp time as a final adjusted cooling ramp time, and propagating, by the controller, the final adjusted cooling ramp time to at least one of a central plant and the effector connected to the thermostat.

The environmental control management system may further include wherein the automatic mode ramp time establishment procedure includes retrieving, by the controller, a final adjusted cooling ramp time by performing the cooling mode ramp time establishment procedure, retrieving, by the controller, a final adjusted heating ramp time by performing the heating mode ramp time establishment procedure, selecting a higher of a previous day's high forecast temperature and a current day's high forecast temperature, comparing the selected higher temperature to the OAHET, in response to the selected higher temperature being greater than or equal to the OAHET selecting the final adjusted heating ramp time as a final adjusted automatic ramp time, in response to the selected higher temperature being less than the OAHET selecting the final adjusted cooling ramp time as a final adjusted automatic ramp time, and propagating, by the controller, the final adjusted automatic ramp time to at least one of a central plant and the effector connected to the thermostat.

In various embodiments, the environmental control management system includes wherein the scheduling the operation of each of the plurality of effectors in response to the occupancy pattern further includes importing, by the controller, data representative of a calendar containing a plurality of calendar events, by a calendar activity engine of the controller, wherein the data includes at least one of dates, times, use types, and rooms, assigning, by the run time, ramp time, and load rolling engine of the controller, the ramp time to each calendar event, and instructing, by the controller, the effector to actuate in response to the ramp time assigned to the calendar event. In various embodiments, actuating includes at least one of turning on, turning off, increasing power, and decreasing power.

The environmental control management system may also include wherein the scheduling the operation of each of the plurality of effectors in response to the occupancy pattern further includes calculating, by the calendar activity engine, an event proximity window including a determined duration of time wherein events spaced apart by no less than the event proximity window are mergeable as a single event, merging, by the calendar activity engine, at least two calendar events of the plurality of calendar events, in response to the at least two calendar events occupying time slots lying within the event proximity window, identifying, by an equipment intelligence engine of the controller, at least one effector of the plurality of effectors of the environmental control management system, wherein the at least one effector is associated with a site of the calendar event, determining, by the equipment intelligence engine of the controller, whether at least one further effector of the plurality of effectors of the environmental control management system has a central plant-peripheral unit relationship wherein the further effector is associated with a central plant shared with the at least one effector, in response to the determining indicating that the effector and the further effector each have central plant-peripheral unit relationships with the central plant, aggregating a load of the effector and the further effector to calculate an aggregated plant load, and in response to the determining indicating that the aggregated plant load is less than a central plant minimum load requirement, selecting by the controller a second further effector for actuating and instructing, by the controller the second further effector to actuate.

In various embodiments, the environmental control management system includes wherein the scheduling the operation of each of the plurality of effectors in response to the occupancy pattern further includes identifying, by a site intelligence engine and effector mapping engine, a meter associated with the effector, evaluating a meter charge profile associated with the meter and stored in the site intelligence database by the site intelligence engine and determining an existence of a demand charge of the meter charge profile, and performing a load rolling method in response to the existence of the demand charge, wherein the load rolling method returns a timeslot precession instruction, and subsequent to the performing the load rolling method, setting an operating time of at least one of the at least one effector and the central plant in response to the timeslot precession instruction.

BRIEF DESCRIPTION OF THE DRAWINGS

For a more complete understanding of various embodiments of the present disclosure and the advantages thereof, reference is now made to the following brief description, taken in connection with the accompanying drawings and detailed description, wherein like reference numerals represent like parts, and in which.

DETAILED DESCRIPTION

Figure 1:
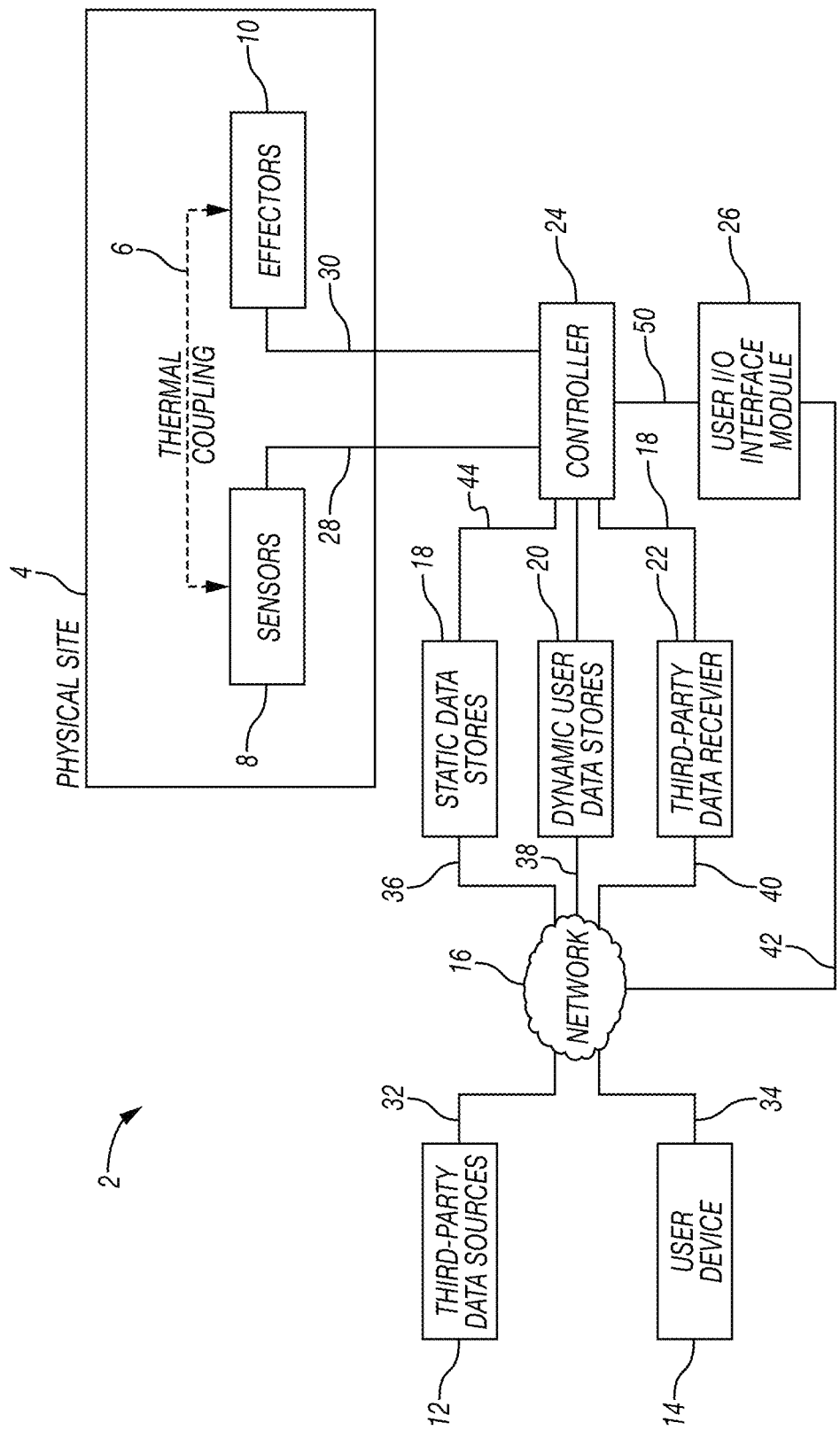
FIG. 1 illustrates a environmental control management system operating within a context environment.

The present disclosure is generally described in detail with reference to embodiments illustrated in the drawings. However, other embodiments may be used and/or other changes may be made without departing from the spirit or scope of the present disclosure. The illustrative embodiments described in the detailed description are not meant to be limiting of the subject matter presented herein.

Reference will now be made to the exemplary embodiments illustrated in the drawings, and specific language will be used to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As discussed herein, example embodiments receive input data including aspects such as intelligence about a building and its equipment, a weekly schedule of events, and a seven-day weather forecast. Various aspects of the data are static and various are dynamic. For instance, the schedule may be updated at will by users, thereby being dynamic. The weather forecast may be downloadable, such as from the NOAA website using a web service and may change from time to time. Moreover, the calendar, being stored in a client's preferred event calendaring system may require some pre-processing (using MS Excel macros, for example) to format the data for import.

The intelligence about the building and its equipment may be assembled in various ways. For instance, this intelligence may be gathered through site audits, energy optimization site visits, and conversation with the client, among other ways, such as automatic machine learning. The data may be static yet configurable. Typically, this data may be entered when the system for a given building is configured, and updated when needed (construction/demolition, HVAC unit replacement, etc.).

This configuration data may include, but is not limited to, the following aspects. For instance, for the building, the data may include (1) what electric meter(s) serves the building, (2) which room names/numbers are supplied electricity through each meter, (3) which HVAC units serve which rooms, and (4) assorted names for each room (often a given physical space will have a different name on the architectural drawings, in systems, in the calendaring system, and on the wall in the physical space). Since clients are often inconsistent in their use of names for a space, a cross reference may be included in system to ensure that the proper equipment runs based on the space occupancy schedule. The data may also include (5) whether or not each electric meter is charged for demand (kW), (6) each meter that is charged for demand will have demand targets (these targets are calculated based on historical demand peaks and adjusted to include savings targets for the building in question), (7) and credentials for logging in to third party interfaces, such as thermostat interfaces for HVAC systems. The configuration may, for the equipment, include (1) for mechanical systems that include a central plant, the relationship between air-handling and terminal units to the central plant, (2) unit name and description, (3) rooms/spaces served by each unit, (4) unit cooling source and capacity, (5) unit cooling system efficiency (kW/ton), (6) availability of economizer mode for cooling, (7) unit heating source and capacity, (8) date-based table of ramp times (time to reach set point from unoccupied mode), (9) set points (if different from those for the other units on the same meter), (10) control type (thermostat, Tridium, other), (11) unique identifiers for control system linkage (thermostat ID, JACE handle, etc.). From a user perspective, the building intelligence data is static, while the calendar and weather data is dynamic.

Calendar data may be input in a batch processing mechanism. For instance, a typical session may occur once a week. In the session, all calendar events for the upcoming week are exported from a calendar system into a template. Any pre-processing macros required to clean up any differences in formatting of the export versus the import requirements of the system are run. The system downloads a weather forecast, such as the current 7-day forecast from the NOAA web service. Various reports may be prepared for human or machine readable consumption. The system further operates to load equipment start/stop times, operating modes, and set points to all thermostats/controllers included in the system. In this manner, the process is designed to translate event times into the most cost-effective equipment start and stop times for the coming week with the minimum amount of effort on the part of the user. Weather, event schedule imports, and equipment start/stop exports may be completed in batches.

In various instances, multiple thermostats are spread through a building so that some temperature sensors may pick up the effects of different heating or cooling systems than the one to which their associated thermostat is connected. As such, the system may perform various across unit processing steps. For instance, interaction between and among multiple thermostats and multiple sensors cross over among one another. Such a method may include various steps.

For instance, after importation of all calendar events for the upcoming scheduling period, running a report triggers an algorithm. The algorithm begins with the last day of the 7-day scheduling period and works backwards in one-day increments to the first day of the scheduling period. It performs the following for each day. (1) For each event being scheduled, the ramp time, adjusted for extreme weather conditions, is added to the event start time. (2) Multiple events within a given day are merged if they meet configurable criteria (e.g. end of first event is within 30 min of start of second event+second event's ramp time). (3) The method determines whether there is a demand charge on the meter and if there is not, skips the demand management portion of the algorithm. (4) If there are no units with "load rolling enabled" for the scheduling period, the method skips the demand management portion of the algorithm. (5) If there are units which are served by a central plant, the method evaluates whether minimum plant load is achieved and adds units (extends already-occupied zones or adds events as needed) if the plant will not achieve its minimum load with only the occupied rooms running. (6) Starting at midnight and working backward in 30-minute intervals, the application calculates the current demand (total of demand for units scheduled "on" during that interval) and compares it to the demand target for the day being processed. If the current demand exceeds the target, the load rolling algorithm is invoked.

A load rolling algorithm may include further steps. For instance, the algorithm may be operable to (1) determine which unit to adjust by adding additional time to that unit's start time. That unit's start time is adjusted earlier in 30-minute increments until that unit's ramp time expires before the time period currently being evaluated. (2) Then the loop is backed up one 30-minute increment to ensure that the shift in load is not creating a peak in the previous interval. (3) As each 30-minute increment is determined to be below the demand target, the loop increments to the next 30-minute interval. (4) Once the demand management adjustment completes successfully, the algorithm evaluates whether central plants (if they exist) still meet minimum load for the interval and adds runtime if needed. (5) Once the day has been checked, the algorithm checks whether any units served by a central plant are being scheduled. If the central plant is needed, the algorithm creates a schedule for the central plant. (6) This iteration continues until all 30-minute increments in the seven day scheduling period have been evaluated.

Once the optimal equipment start and stop time are determined as described above the application may load this data to field devices (thermostats or EMS controllers). Once triggered, all field devices are then programmed for the coming week. The result is that all equipment runs only as much as needed to achieve comfort when people are in the spaces, while keeping peak demand below the programmed target for each meter.

With reference to FIGS. 1-24, often building tenants desire to provide for different environmental characteristics at different controlled sites in the building site (also called "physical site" 4 (FIG. 1)) at different times. As used herein, an environmental characteristic may be a temperature, humidity, temperature change, rate of temperature change, humidity change, or rate of humidity change, or a combination thereof. Different controlled sites in the building may comprise different rooms 110, different areas of large rooms 110, for instance an audience area of an auditorium, a stage area of an auditorium and/or a balcony area of an auditorium, and the like. FIGS. 8-24 provide a helpful depiction of an example physical site 4 having a plurality of controlled sites comprising different rooms 110 or combinations of rooms 110. Various sensors and effectors are distributed throughout. One having ordinary skill in the art will appreciate that the application of the principles, systems, and methods presented herein may be incorporated in a practical system such as that illustrated in FIGS. 8-24.

Challenges arise related to the confluence of variables and constraints that affect the environmental characteristics of controlled sites. For example, external factors such as seasonal temperature and humidity changes, local weather patterns, radiant sunlight, and other external factors may be impactful variables. Furthermore, the occupancy pattern of the different controlled sites, as well as the nature of the use by the occupants may be an impactful variable. For example, a first controlled site may be a kitchen and a second controlled site may be an office. The kitchen and the office may be adjacent and separated by an open doorway. Food preparation activities in the kitchen area may generate significant heat, which may warm the office area. Consequently, the occupancy pattern of the first controlled site may be impactful to the environmental characteristics of the second controlled site. The first controlled site and the second controlled site may each have a set point, which is a desired value of an environmental characteristic. For example the first controlled site (the kitchen) may have a set point comprising a desired temperature of 80 degrees Fahrenheit while a second controlled site (the office) may have a set point comprising a desired temperature of 72 degrees Fahrenheit. However, due to the interaction of the two controlled sites through a doorway, it may be desirable for a controller to automatically adjust the set point associated with the first controlled site (the kitchen) to avoid excessive deleterious effects to the environmental characteristics of the second controlled site (the office), such as continuously or ineffectively running of environmental characteristic effectors such as air conditioners and unwanted elevation of energy consumption.

Moreover, constraints may further impact the environmental characteristics of controlled sites. For example, some controlled sites may be serviced by environmental characteristic effectors 10, such as HVAC systems, central plant systems, radiant heat systems, and/or the like. Such environmental characteristic effectors 10 may receive energy from a utility provider, for instance, an electric power company. This energy may be metered, such as by a power meter, water meter, or gas meter and/or the like. In various instances, the peak energy usage for the environmental characteristic effector 10 or groups of environmental characteristic effectors 10, or controlled sites, or physical sites 4 may be capped and/or may cost different amounts depending on peak usage. Consequently, there may be a desire to maintain the peak usage of a single environmental characteristic effector 10, or a group of environmental characteristic effectors 10 below a peak usage target. For instance, there may be a desire that the aggregate energy usage of all environmental characteristic effectors 10 in a building be below a peak usage target; however, multiple controlled sites may have environmental characteristics calling for activation of the environmental characteristic effectors 10, potentially in simultaneity, or competitively such as having adjacent systems in opposite heating and cooling modes. By ramping, sequencing, and other mechanisms discussed herein, each controlled site may be driven to a desired environmental characteristic value in time to correspond to the occupancy pattern of the controlled sites, without exceeding the peak usage target.

With reference now to FIG. 1, a context environment 2 is provided. A context environment 2 comprises the real-world variables, constraints, structures, systems, and the like within which an environmental control management system 3 operates. For example, a context environment 2 may comprise a building comprising controlled sites having environmental characteristics, experiencing external factors, undergoing occupancy patterns, and associated with environmental characteristic sensors 8 and environmental characteristic effectors 10.

The context environment 2 may further comprise third party data sources 12. Third party data sources 12 may comprise repositories of data impactful to the operation of the environmental control management system 3 provided by external actors and connected to a network 16 by a third-party data source communication channel 32. For example, third party data sources 12 may include weather forecast data, real-time weather data, historical weather data, and sensor data such as temperature and humidity sensors. Third party data sources 12 may comprise external calendar databases whereby the occupancy pattern of different controlled sites may be derived. Third party data sources 12 may also comprise configuration data for aspects of the environmental control management system 3. Third party data sources 12 may comprise utility provider repositories, such as data representative of peak demand limits, daily demand curves, pricing data, usage data, and/or the like.

The context environment 2 may comprise one or more user device 14. A user device 14 may comprise a terminal device or other access mechanism whereby a user may interoperate with the environmental control management system 3, for instance, receiving data regarding the operation of the environmental control management system 3, and providing instructions to the environmental control management system 3 regarding current or future operation and changes to operation. In various instances, a user device 14 may comprise a browser session, such as on an internet browser of a computer. In further instances, a user device 14 may comprise a dedicated hardware device, or may comprise a smart phone running a browser session or an independent application, and/or the like.

The context environment 2 may include a physical site 4, as mentioned above. The physical site 4 may include environmental characteristic sensors 8 and environmental characteristic effectors 10 of the environmental control management system 3. In various instances, there are physical thermal couplings between environmental characteristic sensors 8 and environmental characteristic effectors 10, referred to as sensor-effector thermal couplings 6, whereby the environmental characteristics are sensed and environmental characteristic effectors 10 are characterized and interrelated.

Finally, a context environment 2 may comprise the environmental control management system 3 mentioned above. An environmental control management system 3 may comprise controllers, environmental characteristic sensors 8, and environmental characteristic effectors 10 whereby the environmental characteristics of a physical site 4 may be controlled within the parameters of the variables, constraints, and other data of the context environment 2.

Figure 2:
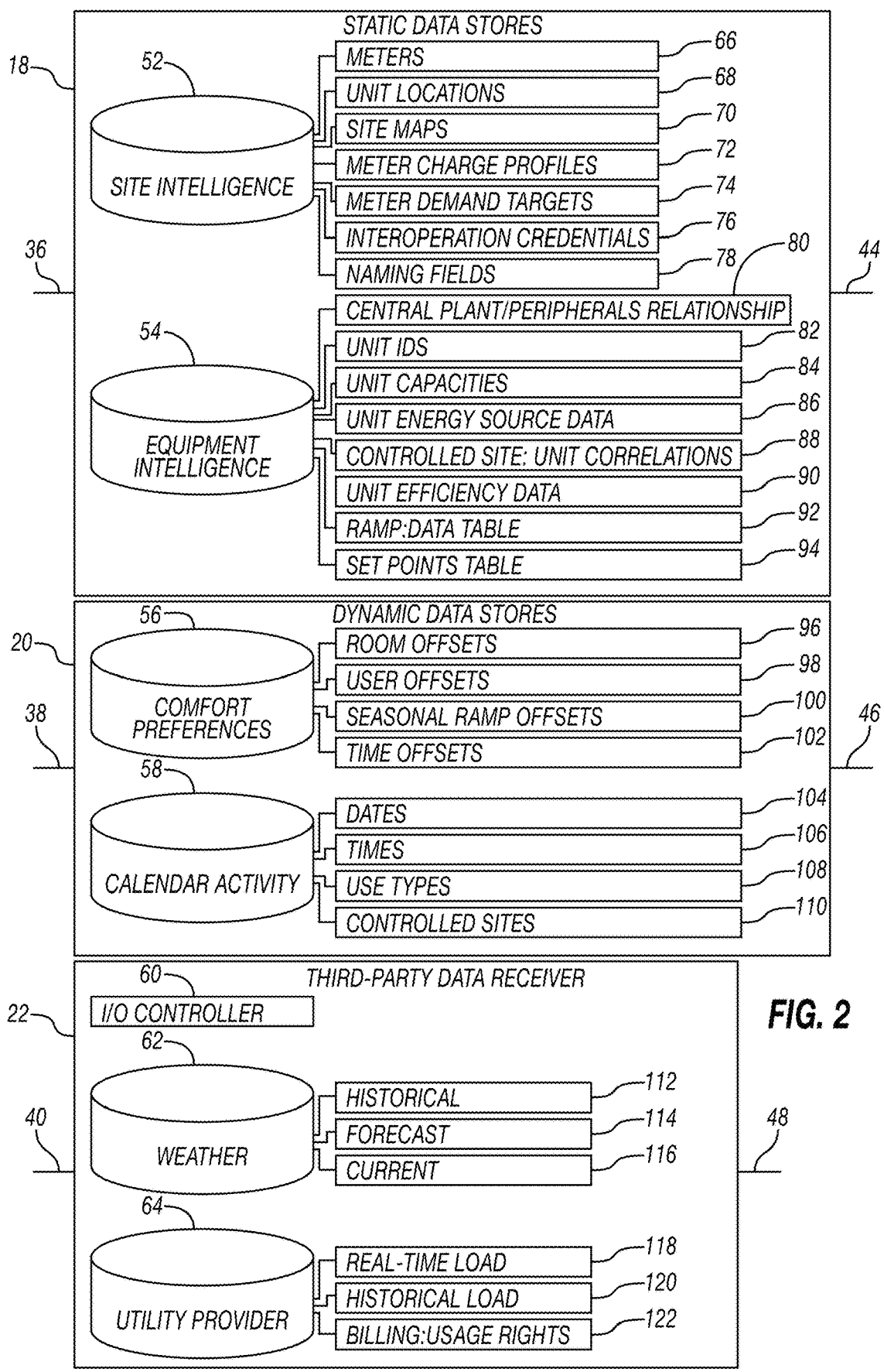
FIG. 2 illustrates aspects of static data stores, dynamic user data stores, and a third party data receiver of an environmental control management system according to FIG. 1.

Now, with ongoing reference to FIG. 1 and additional reference to FIG. 2, the environmental control management system 3 is discussed in detail.

The environmental control management system 3 may include a variety of data stores which receive data from third party data sources 12 via network 16, from user devices 14 via network 16, and from aspects of the environmental control management system 3 discussed further herein. For example, the environmental control management system 3 may include a static data store 18. A static data store 18 may comprise a repository of all data relevant to the environmental control management system 3 which does not typically change over time due to the changing of the context environment 2, such as changing of environmental characteristics, or operation of the environmental characteristic effectors 10. For example, a static data store 18 may comprise data received over a static data store input communication channel 36 during initial set up and configuration of the environmental control management system 3. The static data store 18 may output this data to other aspects of the environmental control management system 3 via a static data store output communication channel 38.

The environmental control management system 3 may also include a dynamic user data store 20. A dynamic user data store 20 may comprise a repository of all data relevant to the environmental control management system 3 which does typically change over time due to the changing of the context environment 2, such as changing calendar activity representative of an occupancy pattern, changing override instructions from a user device 14, or changes to turn on times, turn off times, ramp times, and/or the like for environmental characteristic effectors 10.

The environmental control management system 3 may also include a third party data receiver 22. A third party data receiver 22 may access the third party data sources 12 via a third party data receiver data input channel 40 connected to network 16 and may propagate out third party data via a third party data receiver data output channel 48 to other aspects of the environmental control management system 3, for example static data stores 18 and dynamic user data stores 20. Moreover, the third party data receiver 22 may retain third party data within its own internal data stores, for instance, a weather database 62 and/or a utility provider database 64 which will be discussed further herein.

The environmental control management system 3 may comprise a user I/O interface module 26. The user I/O interface module 26 may interoperate with the other aspects of the environmental control management system 3 via a user I/O interface module private-facing communication channel 50. The user I/O interface module 26 may interoperate with user devices 14 via user I/O interface module public-facing communication channel 42. The user I/O interface module 26 may ingest unstructured data from both internal and external sources, and may structure the data for user readability on a user device 14 and may further structure data for system readability depending on the specific API, protocols, and variables associated with each aspect of the environmental control management system 3.

The environmental control management system 3 may include environmental characteristic sensors 8, as mentioned. Environmental characteristic sensors 8 may interoperate with a controller 24 via a sensor communication channel 28.

The environmental control management system 3 may include environmental characteristic effectors 10. Environmental characteristic effectors 10 may interoperate with a controller 24 via an effector communication channel 30.

One may appreciate that many different types of environmental characteristic sensors 8 and many different types of environmental characteristic effectors 10 may be contemplated.

For instance, environmental characteristic sensors 8 may include sensors integrated into thermostats, sensed data sensed by third party software running HVAC equipment, inside air temperature sensors, outside air temperature sensors, humidity sensors, sunlight sensors, wind sensors, occupancy sensors such as motion detectors, and/or the like.

Moreover, environmental characteristic effectors 10 may include air conditioners, heaters, pumps and pump controllers, hot water controllers, chilled water controllers, steam controllers, lighting, elevators, sewage lifts, water distribution systems, self-calibration aspects of the same, and/or the like.

Finally, and importantly, the environmental control management system 3 may include a controller 24. A controller 24 may direct the environmental characteristic effectors 10 to take actions in response to aspects of the context environment 2. As such, further discussion of the controller 24 is provided following the discussion of each additional aspect of environmental control management system 3 which may provide inputs relevant to the control of environmental characteristic effectors 10 and environmental characteristic sensors 8 by the controller 24.

Having completed a broad overview of components of the environmental control management system 3, the following paragraphs will discuss more specific aspects of these differing components.

Returning focus to the static data store 18, a static data store 18 may comprise a plurality of databases. For instance, a static data store 18 may comprise a site intelligence database 52 and may further comprise an equipment intelligence database 54.

Typically, an environmental control management system 3 will be customized to the physical site 4 such as with respect to the number, type, size, uses, and location of controlled sites, such as rooms 110, throughout the building. The environmental control management system 3 will also be customized to the physical site 4 with respect to the nature of the building structure such as the layout of controlled sites (e.g., rooms 110), number of and arrangement of windows and doors, the number of stories, etc. These and other aspects may be stored in a site intelligence database 52. Specific aspects of the site intelligence database 52 will be discussed further below.

Typically, an environmental control management system 3 will be customized to the type and characteristics of the energy consuming equipment, for instance, the environmental characteristic effectors 10, such as with respect to the number, type, and capacities of heating or cooling units, the existence, size, and minimum load requirements of any central plants, and the operating set points, etc. of the energy consuming equipment. These and other aspects may be stored in an equipment intelligence database 54. Specific aspects of the equipment intelligence database 54 will also be discussed further below.

Returning focus to the dynamic user data store 20, a dynamic user data store 20 may also comprise a plurality of databases. For instance, a dynamic user data store 20 may comprise a comfort preferences database 56 and a calendar activity database 58. Typically, an environmental control management system 3 will adapt to changing conditions within the context environment 2. For instance, changing conditions may include user-driven changes and/or system-driven changes that vary over time to enhance the comfort of occupants. For instance, a particular room known to have a particularly large window may require a different ramp time to achieve a desired internal temperature at 5 AM versus at 5 PM, whereas a particular room with no windows may require the same ramp time to achieve a desired internal temperature at both 5 AM and at 5 PM. These and other aspects may be stored in the comfort preferences database 56. Specific aspects of the comfort preferences database 56 will be discussed further below. Additionally, as used herein, ramp time means the time for specific equipment, operated with a specific strategy, to change the temperature and/or humidity in a specific space from unoccupied conditions to occupied conditions. As used herein, runtime means the time for specific equipment, operated with a specific strategy, to change the temperature and/or humidity in a specific space from outside a first tolerance window to within a first tolerance window during operation during occupied conditions so as to maintain the temperature and/or humidity within a first quiescence range.

The dynamic user data store 20 may also comprise a calendar activity database 58. Typically an environmental control management system 3 will adapt to changing conditions within the context environment 2. For instance, changing conditions may include changing calendars. A user may have a calendar, such as an Outlook®, Apple® or other calendar may indicate that different controlled sites (e.g., rooms 110) will be used for different purposes at different times. Each room is desired to reach a certain temperature and/or humidity in time for the occupant to enjoy the temperature and humidity at the beginning of a calendared event. Moreover, calendars may frequently change as events are added and canceled. These and other aspects may be stored in the calendar activity database 58. Specific aspects of the calendar activity database 58 will be discussed further below.

Directing attention to the third party data receiver 22, the third party data receiver 22 has a weather database 62. The weather database 62 comprises a repository of weather information; for instance, historical weather information 112, forecast weather information 114, and current weather information 116. Thus one may appreciate that the weather database 62 may comprise a mirror of at least third party data, such as provided by an external weather data source, and/or may comprise manually-entered data provided by an administrator, and/or any other weather data of any other source as desired. In this manner, by providing a weather database 62, each instance of the system such as may be installed at many sites may send and receive data with a shared or at least partially shared weather database 62, whereby network congestion may be ameliorated. The weather information may specifically include aspects such as temperature, humidity, dew point, barometric pressure, barometric pressure trend, dew point trend, humidity trend, temperature trend, and/or the like. Moreover, weather information may include aspects such as sun rise and sun set time, current winds, historical winds, and predicted winds. The controller 24 may access and interpret this data when controlling the operation of environmental characteristic effectors 10. Thus, among other information, historical weather information 112, forecast weather information 114, and current weather information 116 may be included by the controller 24 in addition to environmental characteristic sensor 8 inputs, static data stores 18 data, and dynamic user data stores 20 data when determining the operation of environmental characteristic effectors 10.

Also as mentioned, the third party data receiver 22 has a utility provider database 64. The utility provider database 64 comprises data provided by a utility services provider, for instance, an electrical power provider, a gas provider, a water provider, and/or the like. In various instances there may be a desire to manipulate the operation of the environmental characteristic effectors 10 in order to manage the consumption of utility services, such as to manage or limit peak consumption or to shift peak consumption to periods of time in which regional demand is lesser and/or service rates are cheaper. The utility provider database 64 may include data related to real time load 118 (real-time site consumption or real-time regional consumption) or similar historical load 120, or billing rules 122 applicable to particular accounts associated with particular environmental characteristic effectors 10 or subsets of environmental characteristic effectors 10 so that the controller 24 may account for the billing rules 122 and structure the operation of the environmental characteristic effectors 10 to reduce and/or minimize the total cost of utility service for the physical site 4 and all services providers providing services to the physical site 4 in view of real time load 118 and historical load 120. For instance, if historical load 120 during night hours is well below the cap set by a billing rule 122, real time load 118 may be attempted to be shifted to nighttime rather than daytime. Thus, among other data, real time load 118, historical load 120, and billing rules 122 may be included by the controller 24 when determining the operation of environmental characteristic effectors 10.

Finally, the third party data receiver 22 may have an I/O controller 60. The I/O controller 60 may control the communication of data from third party data sources 12 to the aspects of the third party data receiver 22 such as the weather database 62 and the utility provider database 64. For instance, the I/O controller 60 may direct the timing of communication between the weather database 62 and/or the utility provider database 64 and third party data sources 12. For instance, the I/O controller 60 may poll the third party data sources 12 at periodic intervals for updated data. Alternatively, the I/O controller 60 may trigger interrupts directing the weather database 62 and/or the utility provider database 64 to receive data provided by (e.g., "pushed from") the third party data sources 12, such as upon receipt of push calendar updates from an Outlook® calendar provider. Moreover, the I/O controller 60 may format the data to correspond to expected structures, such as to identify relevant and irrelevant variables and to sort the values of the relevant variables into the correct storage locations within the weather database 62 and/or the utility provider database 64.

Resuming focus on the site intelligence database 52, the various data stored or storable therein corresponds to various additional structural and functional aspects of the physical site 4 associated with the environmental control management system 3, which are now detailed. For instance, a site intelligence database 52 may comprise data corresponding to meters 66. Meters 66 may be associated with utility providers and may monitor the amount of utility services consumed ("service utilization"), for instance the instantaneous rate of consumption, the time averaged rate of consumption, and the total amount of services consumed. Meters 66 may be associated with subsets of the environmental characteristic sensors 8 and environmental characteristic effectors 10. Thus there may be multiple meters 66 for a physical site 4. The site intelligence database 52 thus records these relationships.

The site intelligence database 52 may contain meter charge profiles 72. A meter charge profile 72 may comprise data representative of the price to service utilization relationship for a meter 66.

The site intelligence database 52 may contain meter demand targets 74. A meter demand target 74 may comprise data representative of a service utilization cap whereupon the cost of service changes upon exceeding the cap, often becoming more expensive.

The site intelligence database 52 may comprise interoperation credentials 76. Interoperation credentials 76 may comprise authentication information, such as usernames and passwords, needed to access environmental characteristic sensors 8, environmental characteristic effectors 10, third party data sources 12, user devices 14, the network 16, static data stores 18, dynamic user data stores 20, network 16, other data stores, and/or the like. In this manner, the efficiency and security of system operation may be improved.

The site intelligence database 52 may comprise data corresponding to unit locations 68. Unit locations 68 comprise data representing the physical orientation of environmental characteristic effectors 10 within a site map 70 and the range, scale, and power of those environmental characteristic effectors 10.

The site intelligence database 52 may comprise data corresponding to a site map 70. A site map 70 may be data representing the physical structure, thermal couplings, thermodynamic properties, and/or the like of the physical site 4 and associated controlled sites. The site map 70 may facilitate the controller 24 consideration of sensor-effector environmental coupling 6 within the physical site 4.

Finally, the site intelligence database 52 may comprise naming field 78. Naming field 78 comprises human and/or machine-readable tags corresponding to various other data stored within the site intelligence database 52 and facilitating the ingesting and structured processing of the data by other aspects of the environmental control management system 3. Such tagging of data facilitates customization of the environmental control management system 3 for various installations, enhancing system machine learning so that aspects such as the site map 70, meters 66, unit locations 68, meter charge profiles 72, meter demand targets 74, and other data such as that stored in the equipment intelligence database 54 may be automatically derived.

Resuming focus on the equipment intelligence database 54, the various data stored or storable therein corresponds to various additional structural and functional aspects of the environmental control management system 3 operating at a physical site 4, which are now detailed. For instance, an equipment intelligence database 54 may comprise data corresponding to equipment installed at the physical site 4. Specifically, the equipment intelligence database 54 may comprise data relating to a central plant-peripheral unit relationship 80. For example, various heating and/or cooling systems include a central plant which provides a thermal energy source or sink, and several peripheral units (e.g., environmental characteristic effectors 10) associated with the central plant and configured to conduct the thermal energy into or away from areas of a physical site 4. Data representative of the association of various units with a shared central plant may be stored in the equipment intelligence database 54 and comprises a central plant-peripheral unit relationship 80.

The equipment intelligence database 54 may further comprise data corresponding to unit IDs 82. A unit ID 82 comprises a designator code or text string assigned to different equipment, such as environmental characteristic sensors 8 or environmental characteristic effectors 10 that designate the type, features, location, or unique address of the piece of equipment, such as a specific environmental characteristic sensor 8 or a specific environmental characteristic effector 10.

The equipment intelligence database 54 may comprise data corresponding to a unit capacity 84. For example, data may be stored representing the capability of a specific environmental characteristic effector 10 to effect the context environment 2, such as an indicator of how powerful an environmental characteristic effector 10 is or the amount of thermal energy the environmental characteristic effector 10 can sink or source over a given period of time.

The equipment intelligence database 54 may comprise data corresponding to a unit energy source 86. A unit energy source 86 may indicate whether an environmental characteristic effector 10 is electrically powered, gas powered, water powered, utilizes a central plant, is associated with a particular meter 66 and/or the like.

The equipment intelligence database 54 may comprise data corresponding to room-to-unit correlations 88. For instance, a plurality of environmental characteristic sensors 8 and environmental characteristic effectors 10 are scattered throughout a physical site 4. The physical site 4 may have multiple controlled sites (e.g., rooms 110) or other regions or locations. The correlation of the environmental characteristic sensor 8 or environmental characteristic effector 10 to a controlled site such as a location, room 110, or region of the physical site 4 is important for determining the sensor-effector environmental coupling 6 across the physical site 4 as well as determining the effectiveness of environmental characteristic effectors 10 to sink or source sufficient thermal energy to drive the environment within the physical site 4 to the desired target temperature and/or humidity at the desired time based on the variables and without exceeding the constraints.

The equipment intelligence database 54 may comprise data corresponding to unit efficiency 90. For instance, data corresponding to the relationship between energy consumed by an environmental characteristic effector 10 and thermal energy sinked or sourced by the environmental characteristic effector 10 as well as corresponding to the tendency of different areas of the context environment 2, such as different rooms 110 of a physical site 4 to lose or retain heat may be stored in order to tailor the instructions provided to the environmental characteristic effector 10 by the controller 24 and to interpret the data received from environmental characteristic sensors 8 by the controller 24.

The equipment intelligence database 54 may comprise data corresponding to ramp-to-date tables 92. A ramp-to-date table 92 may comprise a table of unit ramp on times corresponding to data, such as to accommodate general seasonal variations in the context environment 2. For instance, during hot times of the year, the unit ramp on time may be longer than during cool times of the year for particular rooms 110 of the physical site 4 within the context environment 2.

Finally, the equipment intelligence database 54 may comprise data corresponding to set points tables (or seasonal values tables) 94. Set points tables (or seasonal values tables) 94 comprise a table of set points, meaning a table of desired environmental characteristics, such as a table of target temperatures to which environmental characteristic effectors 10 should be operated in order to drive one or more environmental characteristic sensors 8 to indicate the desired environmental characteristic, such as target temperature due to the sensor-effector environmental coupling 6 and/or season of year. The controller 24 may change the set points stored in the set points table (or seasonal values table) 94 and may retrieve the set points and transmit them to environmental characteristic effectors 10 in order to manage the environmental characteristics of the controlled sites.

Shifting focus away from the site intelligence database 52 and equipment intelligence database 54 of the static data store 18, focus is now directed to the comfort preferences database 56 and the calendar activity database 58 of the dynamic user data store 20.

A comfort preferences database 56 may comprise data corresponding to room offsets 96. A room offset 96 is a custom instruction for a particular environmental characteristic sensor 8 and/or environmental characteristic effector 10 corresponding to unique behavior of that room due to sensor-effector environmental coupling 6 and or due to user preferences. For example, an environmental characteristic sensor 8 in a hallway may perceive the temperature associated with two offices; however different environmental characteristic effectors 10 may be associated with each of the offices. A room offset 96 may be associated with one office that experiences undesirable thermal variations such as due to a large window. Thus, a room offset 96 may be programed directing the environmental characteristic effector 10 associated with that office to operate longer or more powerfully, despite the environmental characteristic sensor 8 otherwise indicating that the environmental characteristic effector 10 should shut off or operate less powerfully.

A comfort preferences database 56 may comprise data corresponding to user offsets 98. For instance, entries in the calendar activity database 58 may indicate the identity of an individual associated with the calendar entry. Certain users may prefer an environmental characteristic different from that which is typical. For example, certain users may prefer a warmer or cooler environment. Consequently, the environmental characteristic sensors 8 and environmental characteristic effectors 10 associated with achieving the desired temperature and humidity for the calendar event may be further adjusted to also achieve an additional temperature or humidity variation based on the controlled site (e.g., room 110) to be occupied by the identified user.

A comfort preferences database 56 may further comprise data corresponding to seasonal ramp offsets 100. For instance, during certain times of year, additional ramp up time may be desired to be associated with certain rooms 110 that are affected by the seasonal variation in the external context environment 2. As such, environmental characteristic sensors 8 and environmental characteristic effectors 10 associated with the certain rooms 110 may be further adjusted to achieve a desired temperature and humidity variation accounting for the change in thermal characteristics of the physical site 4 associated with the season. For example, a lobby area with a frequently opening and closing door may require a longer ramp up time, or may require a change in duty cycle for environmental characteristic effectors 10 during times of cold weather due to the frequent opening and closing of the door. Additionally, hysteresis may be configured into the environmental characteristic sensors 8 and environmental characteristic effectors 10 and adjusted based on seasonal ramp offsets 100. A comfort preferences database 56 may receive data corresponding to seasonal ramp offsets 100 associated with weather adjustments, such as to drive the setting of thermostat modes and weather adjusted ramp times as disclosed in FIGS. 6A-7B and discussed further herein below.

Finally, the comfort preferences database 56 may comprise data corresponding to time offsets 102. For example, certain times of day may be associated with different adjustments to the environmental characteristic sensors 8 and the environmental characteristic effectors 10 due to changes in thermal characteristics of the physical site 4 associated with the time of day (e.g., associated with the direction of sunlight).

A calendar activity database 58 of the dynamic user data store 20 may comprise data associated with dates 103, times 106, types of use of controlled sites, such as rooms 110 (use types 108), as well as which controlled site (room 110) is being used. A date 103 may indicate when an event is planned, a time 106 may indicate when an event begins and ends, a use type 108 may indicate the nature of the event so that environmental characteristic sensor 8 and environmental characteristic effector 10 behavior may be customized so as to accommodate the event (for instance, an environmental characteristic effector 10 may run with a greater duty cycle during an athletic event with a large number of people having a large amount of body heat, versus during another type of event), and the controlled sites (rooms 110) being used may be indicated in order to determine which environmental characteristic sensors 8 or environmental characteristic effectors 10 are affected in view of the sensor-effector environmental coupling 6 of the physical site 4.

Figure 3:
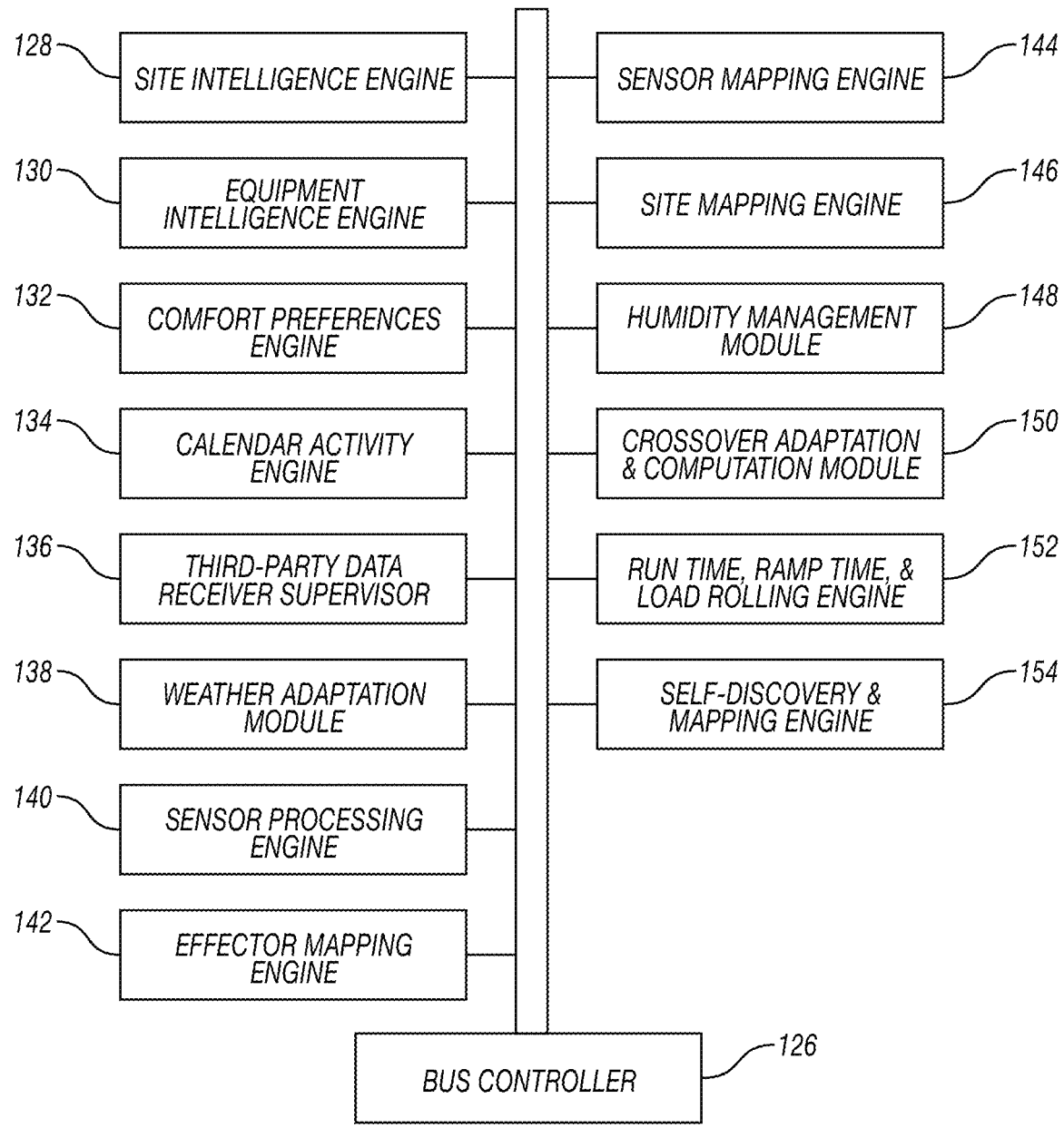
FIG. 3 illustrates aspects of a controller of an environmental control management system according to FIG. 1.

With continuing reference to FIGS. 1 and 2, and additional reference to FIG. 3, the controller 24 is discussed in greater detail. A controller 24 may comprise a bus 124 and a bus controller 126. The bus 124 may comprise a physical bus, or may comprise a logical bus resident in the controller 24. Moreover, the bus controller 126 may comprise a logical unit of the controller 24 configured to direct communications between and among the different engines and modules connected to the bus 124 and similarly among the controller 24 and external aspects.

The controller 24 may comprise a site intelligence engine 128. The site intelligence engine 128 comprises an aspect of a processor and/or electronic storage memory configured to receive, process, and store site intelligence data in a site intelligence database 52 of a static data store 18.

The controller 24 may comprise an equipment intelligence engine 130. The equipment intelligence engine 130 comprises an aspect of a processor and/or electronic storage memory configured to receive, process, and store equipment intelligence data in an equipment intelligence database 54.

The controller 24 may comprise a comfort preferences engine 132. The comfort preferences engine 132 comprises an aspect of a processor and/or electronic storage memory configured to receive, process, and store comfort preferences data in a comfort preferences database 56.

The controller 24 may comprise a calendar activity engine 134. The calendar activity engine 134 comprises an aspect of a processor and/or electronic storage memory configured to receive, process, and store calendar activity data in a calendar activity database 58.

The controller 24 may comprise a third party data receiver supervisor 136. A third party data receiver supervisor 136 may instruct the third party data receiver 22 to receive, reject, acknowledge, request, process and/or store data from third party data sources 12. For instance, the third party data receiver supervisor 136 may comprise an aspect of a processor and/or electronic storage memory configured to receive, reject, acknowledge, request, process, and/or store weather data in a weather database 62. The third party data receiver supervisor 136 may further comprise a further aspect of a processor and/or electronic storage memory configured to receive, reject, acknowledge, request, process, and/or store utility provider data in a utility provider database 64.

The controller 24 may comprise a weather adaptation module 138. The weather adaptation module 138 may ingest all relevant data available in the various databases and third party data sources 12 and instruct the environmental characteristic effectors 10 to respond to the environmental characteristic sensors 8 with consideration for the effect that weather has on the context environment 2, for instance, requiring greater run time, ramp time, duty cycle, different set points, and/or the like. The weather adaptation module 138 frequently interoperates with the run time, ramp time, and load rolling engine 152. In this manner, ramp times may be adjusted in response to weather conditions and saved in the comfort preferences database 56, and thermostat modes may be adjusted according to weather conditions and saved in the comfort preferences database 56.

The controller 24 may comprise a sensor processing engine 140. A sensor processing engine 140 may comprise an aspect of a processor and/or electronic storage memory configured to receive, reject, acknowledge, request, process and/or store data provided by environmental characteristic sensors 8 over sensor communication channels 28.

The controller 24 may comprise an effector mapping engine 142. The effector mapping engine 142 may comprise an aspect of a processor and/or electronic storage memory configured to interoperate with, poll, query, and/or monitor environmental characteristic effectors 10 connected to the environmental control management system 3 and deduce through machine learning the type, location, features, and functionality of environmental characteristic effectors 10, so that the system is adaptable to growing, shrinking, or reconfiguration, such as due to building construction or renovation. In various embodiments, the effector mapping engine 142 interoperates with a user device 14 so that a user may manually map the environmental characteristic effectors 10.

The controller 24 may comprise a sensor mapping engine 144. The sensor mapping engine 144 may comprise an aspect of a processor and/or electronic storage memory configured to interoperate with, poll, query, and/or monitor environmental characteristic sensor 8 connected to the environmental control management system 3 and deduce through machine learning, the type, location, features, and functionality of environmental characteristic sensors 8, so that the system is adaptable to growing, shrinking, or reconfiguration, such as due to building construction or renovation. In various embodiments, the sensor mapping engine 144 interoperates with a user device 14 so that a user may manually map environmental characteristic sensors 8.

The controller 24 may comprise a site mapping engine 146. The site mapping engine 146 may comprise an aspect of a processor and/or electronic storage memory configured to develop site maps 70 such as through machine learning and/or interoperation with a user device 14 so that a user may manually map the physical site 4.

The controller 24 may comprise a humidity management module 148. A humidity management module 148 may adjust set points, run times, ramp times, and/or the like so the environmental characteristic effectors 10 operate in a manner to diminish the humidity, increase the humidity, and/or maintain the humidity within the physical site 4. In various embodiments, the humidity management module 148 operates to control the environmental characteristic effectors 10 without input from an environmental characteristic sensor 8 sensing humidity, whereas in further embodiments, the humidity management module 148 accepts input from an environmental characteristic sensor 8 sensing humidity.

The controller 24 may comprise a cross-over adaptation and computation module 154. The cross-over adaptation and computation module 154 may determine strength of the sensor-effector coupling 6 for different environmental characteristic sensors 8 and environmental characteristic effectors 10. For instance, an environmental characteristic sensor 8 in an adjacent room to an environmental characteristic effector 10 may couple to the environmental characteristic effector 10 via airflow through a door way but may be primarily influenced by a different environmental characteristic effector 10, whereas an environmental characteristic sensor 8 in the same room as an environmental characteristic effector 10 may be primarily influenced by the co-located environmental characteristic effector 10. The controller 24 may derive further information regarding the context environment 2 by computing the correlation between behavior of environmental characteristic effectors 10 and responses of environmental characteristic sensors 8 for environmental characteristic sensors 8 at various proximities to the environmental characteristic effector 10. As such, a cross-over adaptation and computation module 154 may be implemented to develop and characterize these relationships and store data representative of the relationship in a static data store 18, such as a site intelligence database 52 (for derivation of site maps 70 through machine learning) and such as an equipment intelligence database 54 (for derivation of room-to-unit correlations 88), and/or further aspects as desired.

The controller 24 may comprise a run time, ramp time, and load rolling engine 152. The run time, ramp time, and load rolling engine 152 may determine the run time, the ramp time, set points and/or the duty cycle for each environmental characteristic effector 10 in response to other aspects of the system, the environmental characteristic sensors 8 and the third party data sources 12. The weather adaptation module 138 frequently interoperates with the run time, ramp time, and load rolling engine 152. In this manner, ramp times may be adjusted in response to weather conditions and saved in the comfort preferences database 56, and thermostat modes may be adjusted according to weather conditions and saved in the comfort preferences database 56.

The controller 24 may comprise a self-discovery and mapping module 156 which interoperates with all the other modules, and specifically the cross-over adaptation and computation module 154 to develop data for static data store 18, such as a site intelligence database 52 (for derivation of site maps 70 through machine learning), such as an equipment intelligence database 54 (for derivation of room-to-unit correlations 88), and/or further aspects as desired. The self-discovery and mapping module 156 may query environmental characteristic sensors 8 and environmental characteristic effectors 10 so that the number, location, and characteristics of environmental characteristic sensors 8 and environmental characteristic effectors 10 and the site maps 70 may be derived, among other information.

Thus, in view of the preceding, one may appreciate that an environmental control management system 3 may operate to achieve comfortable environments such as temperature and humidity in time for occupancy to begin, may manage humidity within an area, and may manage energy demand to keep demand below peak limits set by utility service providers.

Figure 4:
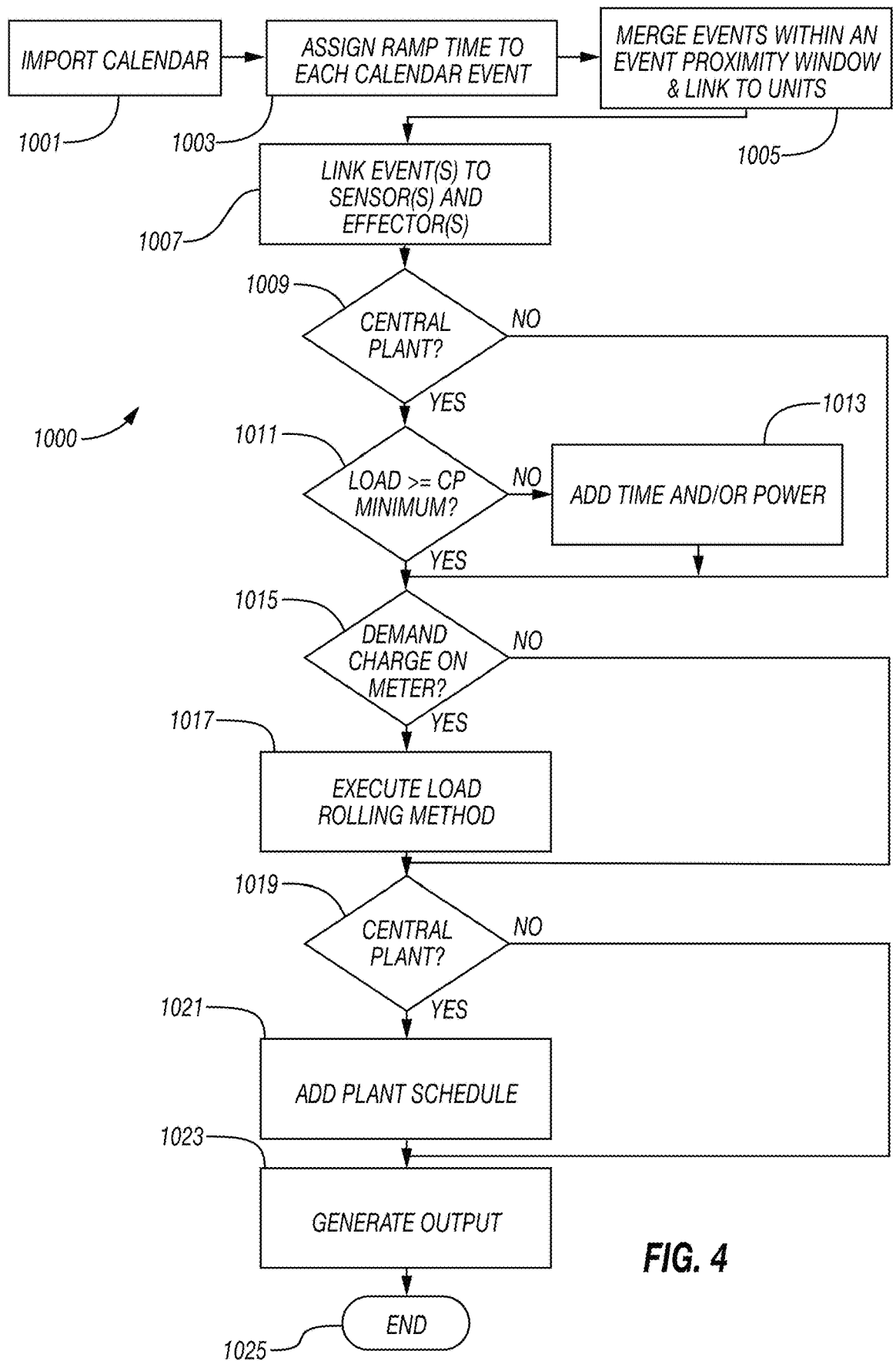
FIG. 4 is a flowchart showing elements of a environmental control management method, according to various embodiments.
Figure 5:
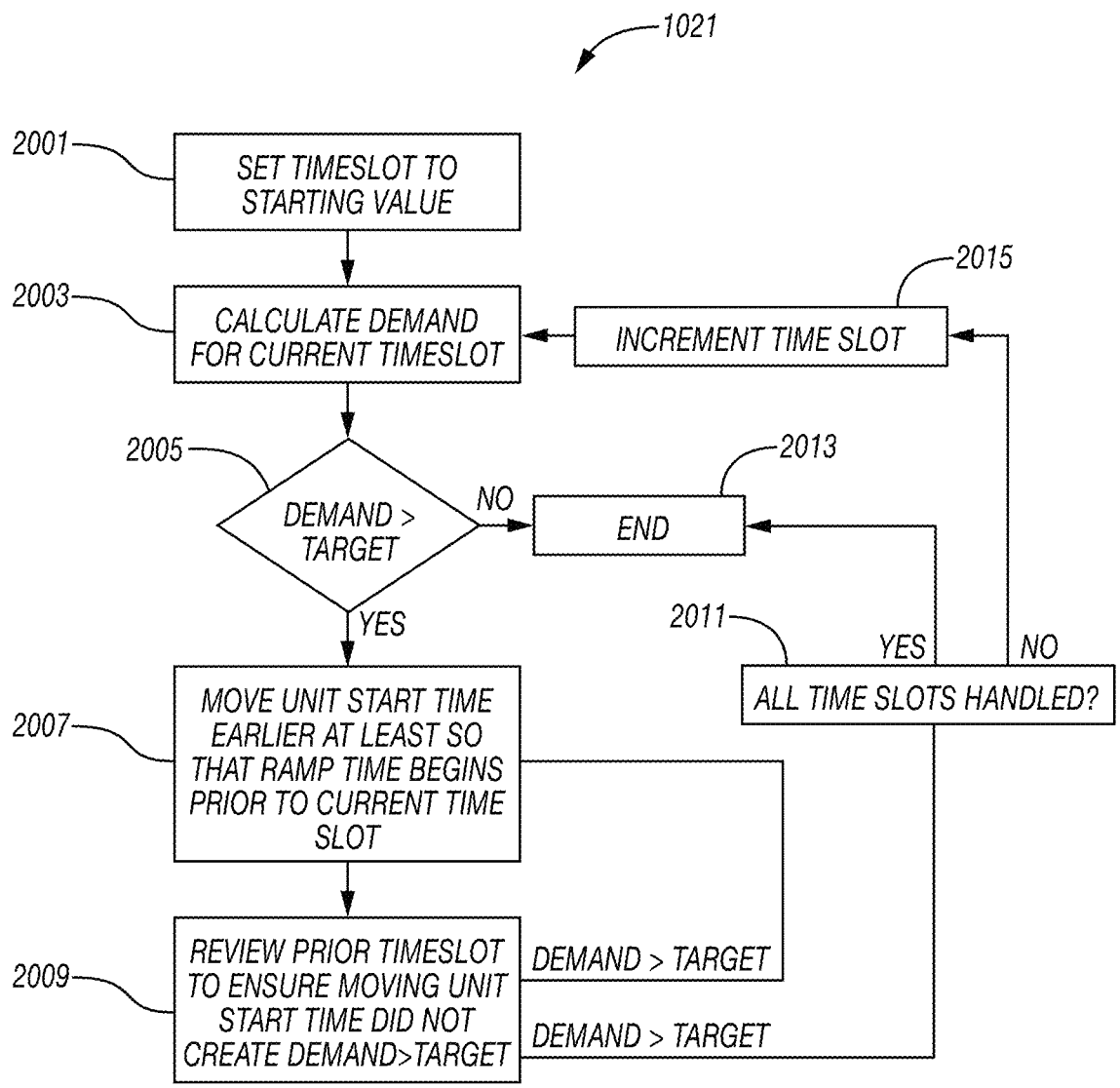
FIG. 5 is a flow chart showing elements of a load rolling method, according to various embodiments.

Having discussed structural aspects of an environmental control management system 3, continued attention is directed to FIGS. 1-3 and additional attention is directed to FIG. 4, for a discussion of a method of environmental control management 1000. As discussed herein, a controller 24 may interoperate with the other aspects of the environmental control management system 3 to perform the method 1000.

For instance, the method of environmental control management 1000 may include importing a calendar (step 1001). Importing a calendar may comprise receiving from a third party data source 12 data representative of a calendar and, in response to a calendar activity engine 134 of a controller 24, storing the data representative of a calendar in a calendar activity database 58 of a dynamic user data store 20. The data representative of a calendar may include dates 103, times 106, use types 108, and/or rooms 110.

The method 1000 may further include assigning, by the controller 24, and specifically, a run time, ramp time, and load rolling engine 152 of the controller 24, a ramp time to each calendar event. The ramp time may be stored in a ramp-to-date table 92 of an equipment intelligence database 54 of the static data stores 18, and/or may be combined by the run time, ramp time, and load rolling engine 152 with data from a ramp-to-date table 92 and further augmented with seasonal ramp offsets 100 from a comfort preferences database 56 of the dynamic user data stores 20 (step 1003). An instruction may be provided to an environmental characteristic effector 10 by the controller 24 directing the effector to turn on, turn off, increase power, decrease power, and/or the like (e.g., "actuate"), in response to the ramp time assigned to the calendar event.

In various instances, assigning a ramp time to an event may include aspects of FIG. 6A-D, which provides a method of daily weather-responsive effector ramp time determination 3000. Moreover, as one may appreciate, various effectors may transition between primarily heating, primarily cooling, and both modes in response to weather data, for instance, a method 3000 of daily weather-responsive effector ramp time determination 3000 may further comprise a submethod of weather responsive regime adaptation method 3500 as presented in FIG. 7A-B herein. As used herein, weather responsive operational regime adaptation 3500 refers to an operational mode selection such as, for example, heating, cooling, or both. Moreover, due to the calculation intensive nature of certain aspects of step 1003, one may appreciate that the step may be performed in temporal overlap with another step or steps, for instance, step 1005 discussed below.

The method 1000 may further include, merging, by the controller 24 calendar events which, following the assignment of a ramp time, occupy times slots lying within an event proximity window (step 1005). An event proximity window may comprise a determined duration of time wherein events spaced apart by no less than the event proximity window may be merged as a single event. The calendar activity engine 134 of the controller 24 may, in communication with the run time, ramp time, and load rolling engine 152, calculate the event proximity window and the merger of calendar events spaced apart by no less than the event proximity window.

The method 1000 may include identifying, by the controller 24, and specifically, the equipment intelligence engine 130, which units (e.g., environmental characteristic effectors 10) of the environmental control management system 3 are affected by the event (e.g., "associated with the site of the calendar event" or "linked to the event"), meaning which environmental characteristic effectors 10 are impactful to the environmental characteristics of the controlled site(s) associated with the event. The controller 24 may further identify which environmental characteristic sensors 8 are relevant for the monitoring of the effectiveness of the environmental characteristic effectors 10. In various instances, a cross-over adaptation and computation module 150 of the controller 24 determines which environmental characteristic sensors 8 are relevant for the monitoring of the effectiveness of the environmental characteristic effectors 10 in view of sensor-effector thermal coupling 6 within the physical site 4. The event may be said to be "linked" to identified sensors and effectors. (collectively, step 1007).

The method 1000 may include determining, by the controller 24 and specifically, by the equipment intelligence engine 130 which affected units identified in step 1007 are associated with a central plant (step 1009). A determination of whether a central plant-peripheral unit relationship 80 exists is important because in response to there being a relationship, the central plant may have a minimum load requirement. In response to there being no central plant-peripheral unit relationship 80, the method proceeds to step 1015 discussed further below.

In response to a central plant-peripheral unit relationship 80 being identified, the load presented by all environmental characteristic effectors 10 associated with the central plant is aggregated. If the load is less than the central plant minimum load requirement (step 1011), then extra environmental characteristic effectors 10 are selected by the controller 24 to run and/or selected environmental characteristic effectors 10 are selected by the controller 24 to run at a greater power (step 1013) so that the load on the central plant reaches the minimum load requirement.

The method 1000 proceeds to step 1015 wherein the relevant meters 66 associated with the environmental characteristic effectors 10 are identified by the site intelligence engine 128 of the controller 24, in conjunction with the effector mapping engine 142 of the same. The controller determines which meters, if any are associated with a demand charge by evaluating the meter charge profiles 72 stored in the site intelligence database 52 (step 1015). For instance, the controller 24, and specifically, the site intelligence engine 128, may determine that no affected meters are associated with a demand charge so that the method proceeds to step 1019. Alternatively, the controller, and specifically, the site intelligence engine 128 may determine that certain meters are associated with a demand charge (step 1017), and thus load rolling needs to be performed (e.g., environmental characteristic effectors 10 need to be operated in sequence rather than parallel in order to maintain the demand below a certain level). In such an instance, the method proceeds to step 1017 comprising performing a load rolling method, after which the method proceeds to step 1019.

In response to proceeding to step 1019, the central plant-peripheral unit relationship 80 is revisited and in the event that a central plant was identified as being associated with affected units, the operating times of the central plant 1019 are set in order to permit the determined operating times of the environmental characteristic sensors 8 and environmental characteristic effectors 10 (step 1021), the representative output is generated (step 1023) and the method ends (step 1025). In response to a central plant not being identified as being associated with affected units, the representative output is generated (step 1023) and the method ends (step 1025). In various instances, the representative output comprises instructions to environmental characteristic sensors 8, environmental characteristic effectors 10, and central plant(s), if any.

Shifting emphasis to FIGS. 1-3 and FIG. 5, the load rolling method 1021 is further detailed. A load rolling method 1021 may comprise accessing a loaded calendar having a sequence of time slots, such as weeks, days, hours, portions of hours, minutes, and/or the like. In various embodiments, a time slot comprises a thirty minute window of time. The controller 24, and specifically, a run time, ramp time, and load rolling engine 152 of the controller 24, may select a timeslot, for instance, the last thirty minute window of time within a seven day week of time. Thus, the controller 24, and specifically, the run time, ramp time, and load rolling engine 152, may set a time slot variable to a starting value (step 2001). The controller 24, and specifically, the run time, ramp time, and load rolling engine 152 may calculate the demand associated with a particular meter 66 during that timeslot (step 2003). In the event that the demand is less than or equal to a target, for instance, a meter demand target 74 corresponding to a demand level beyond which the utility provider accelerates the cost structure for consuming energy, the method ends (step 2013). In the event that the demand exceeds a target, for instance, a meter demand target 74 corresponding to a demand level that accelerates the cost structure of the utility provider for consuming energy, the method proceeds to step 2007.

Specifically, the run time, ramp time, and load rolling engine 152 of the controller 24 provides a timeslot precession instruction. This means that the engine 152 of the controller 24 moves the unit start time of one or more unit (e.g., environmental characteristic effector 10) associated with the meter 66 to a timeslot selected so that the ramp time of the unit (e.g., environmental characteristic effector 10) associated with the meter 66 being prior to the current timeslot (step 2007). In this manner, the total load associated with the meter 66 may be distributed over time so that the instantaneously load does not exceed the meter demand target 74.

Subsequently, the run time, ramp time, and load rolling engine 152 of the controller 24 reviews the prior timeslot to ensure that moving the start time did not create a demand greater than the meter demand target 74 at a different timeslot (step 2009). In the event that it did, the method returns to step 2007 to further move the unit start time, whereas in the event that it did not, the controller 24, and more specifically, the run time, ramp time, and load rolling engine 152, this time in coordination with the calendar activity engine 134 verifies that all time slots for the selected calendar period, in this instance, one week, are handled (step 2011). If so, the method ends (step 2013). If not, then the run time, ramp time, and load rolling engine 152 increments the time slot being evaluated (step 2015) and the method returns to step 2003.

Furthermore, with reference to FIGS. 6A-7B, a method 3000 of daily weather-responsive effector ramp time determination which may include an optional weather responsive regime adaptation method 3500 is depicted. In various instances, the run time, ramp time, and load rolling engine 152 adjusts the ramp time associated with one or more environmental characteristic effector 10 with appreciate for the environmental effects to the context environment 2 presented by ambient weather conditions. As depicted in FIGS. 6A-7B, the ramp time may be adjusted according to various calculations in response to the time of the event at issue, as well as the forecast high temperature, the forecast low temperature, and/or other aspects as desired. Moreover, a weather responsive regime adaptation method 3500 may in various instances be further implemented with respect to determining whether the system should be operative in a primarily heating mode, a primarily cooling mode, or a both heating and cooling mode as desired.

Figure 6A:
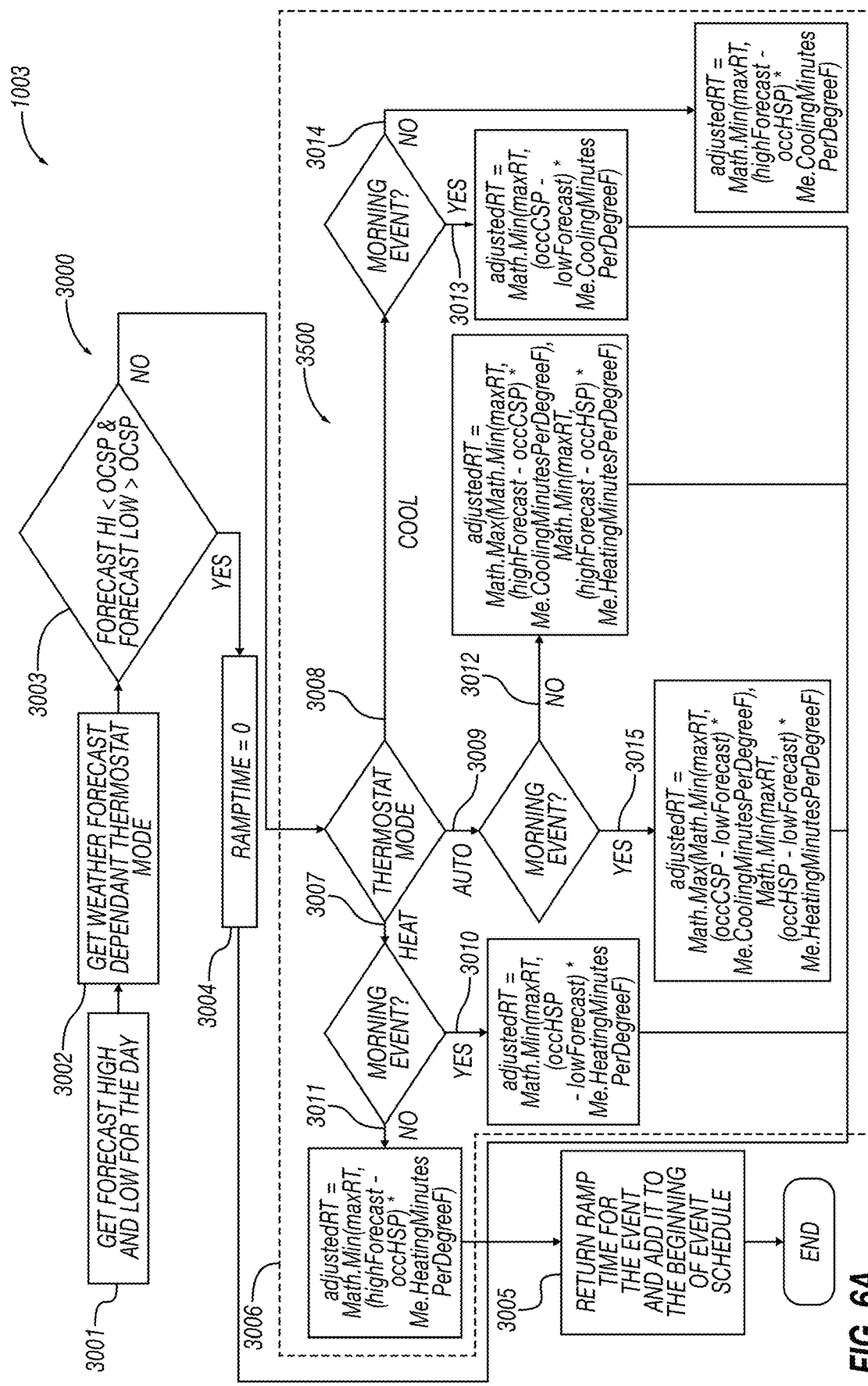
FIGS. 6A-D show elements of at least one example weather condition adaptation method, according to various embodiments.

With specific attention to FIG. 6A in addition to FIGS. 1-5, a method of daily weather-responsive effector ramp time determination 3000 is provided. The method 3000 may include obtaining weather forecast data for the day, such as from a weather database 62 of a third party data receiver 22. Such obtaining may include directing the weather database 62 to query external resources, such as upon a first operation of the day, to load weather data into the database for subsequent use (step 3001). Following obtaining the weather, the method may include obtaining the mode of the thermostat, such as via a weather responsive operational regime adaptation 3500 which operates to set a mode of operation of a thermostat responsive to the weather (step 3002). For instance, by using the weather responsive regime adaptation method 3500, a thermostat mode may be determined by comparing forecast temperatures to certain set points of the system. In response to the outcome of the various comparisons, as well as a determination of the time of day, different ramp times may be set. For instance, in response to a forecast high temperature being less than a temperature corresponding with a shift to a cooling mode when the site is occupied (OCSP or "occupied cooling set point" or OACET, which is an "Outside Air Cooling Enable Temperature" that can be retrieved from a seasonal values table corresponding to outside air temperatures associated with a shift to a cooling mode at different dates/seasons of the year) as well as a forecast low temperature being greater than a temperature corresponding with a shift to a heating mode when the site is occupied (OHSP or "occupied heating set point" or OAHET, which is an "Outside Air Heating Enable Temperature" that can be retrieved from a seasonal values table corresponding to outside air temperatures associated with a shift to a heating mode at different dates/seasons of the year) (step 3003), a ramp time maybe set to zero (step 3004) and returned to a comfort preferences database 56 for association with an operation of an environmental characteristic effector 10 (step 3005). Otherwise, a ramp time adjustment flow 3006 may be followed. For instance, a thermostat mode may be set to heat (step 3007) or to cool (step 3008) or to automatic (step 3009) in response to a weather responsive operational regime adaptation 3500.

In each instance, different calculations may be performed for morning events than for non-morning events. For instance, a morning event may be associated with an unoccupied building, whereas a non-morning event may be associated with an occupied building that has been in use for earlier day-time activities. For further instance, a morning event may be associated with a colder part of a day that is warming, whereas a non-morning event may be associated with warmer part of the day that is quiescing, warming, or cooling, depending on other factors. Thus, for the thermostat mode having been set to heat (step 3007) a morning event (step 3010) may be associated with a ramp time calculation based on a forecast low temperature, whereas an evening event (step 3011) may be associated with a ramp time calculation based on a forecast high temperature. For the thermostat mode having been set to auto (step 3009) a morning event (step 3015) may be associated with a ramp time calculation based on a forecast low temperature, whereas an evening event (step 3012) may be associated with a ramp time calculation based on a forecast high temperature. For the thermostat mode having been set to cool (step 3008) a morning event (step 3013) may be associated with a ramp time calculation based on a forecast low temperature, whereas an evening event (step 3014) may be associated with a ramp time calculation based on a forecast high temperature.

Figure 6B:
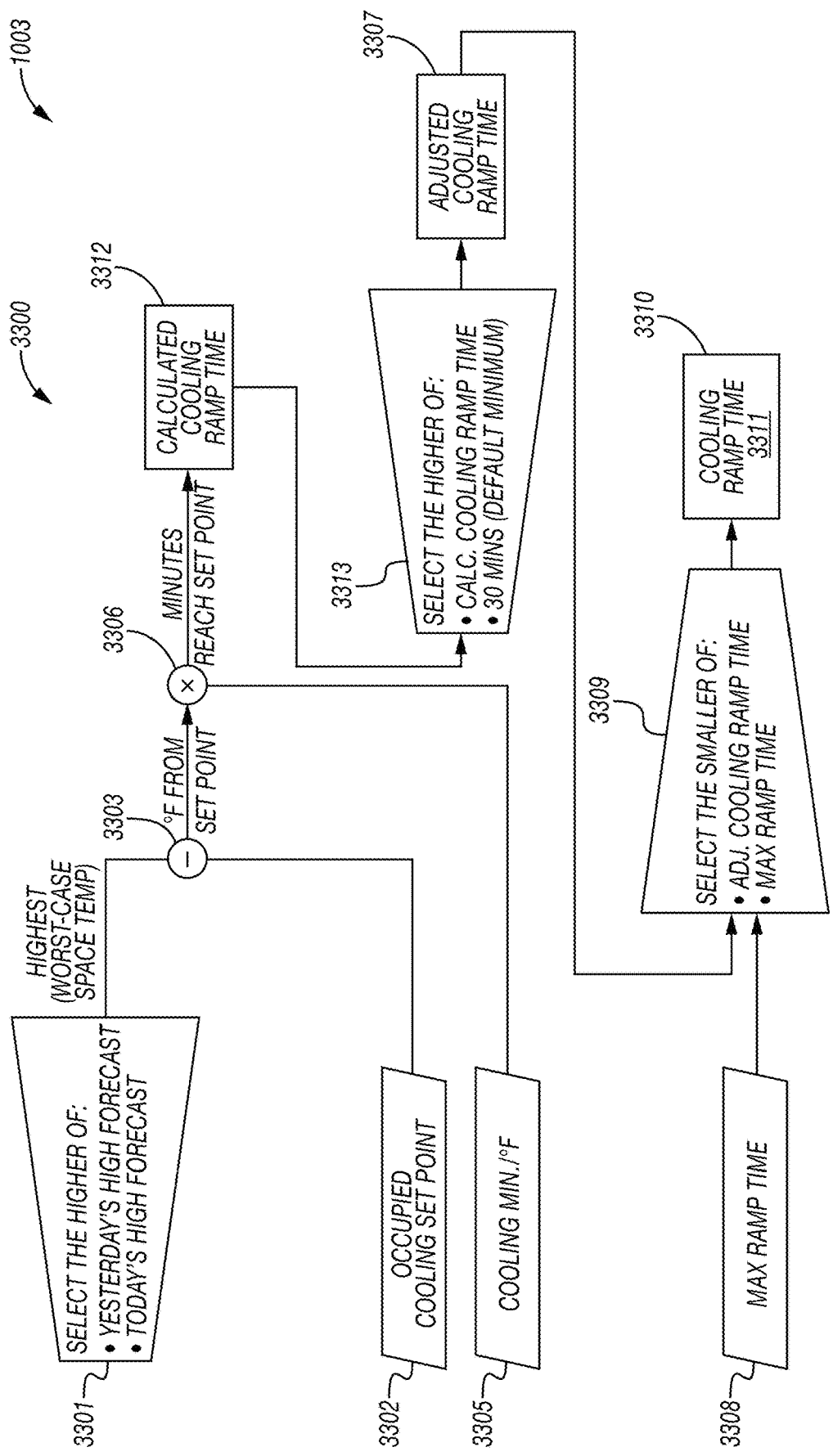
Figure 6C:
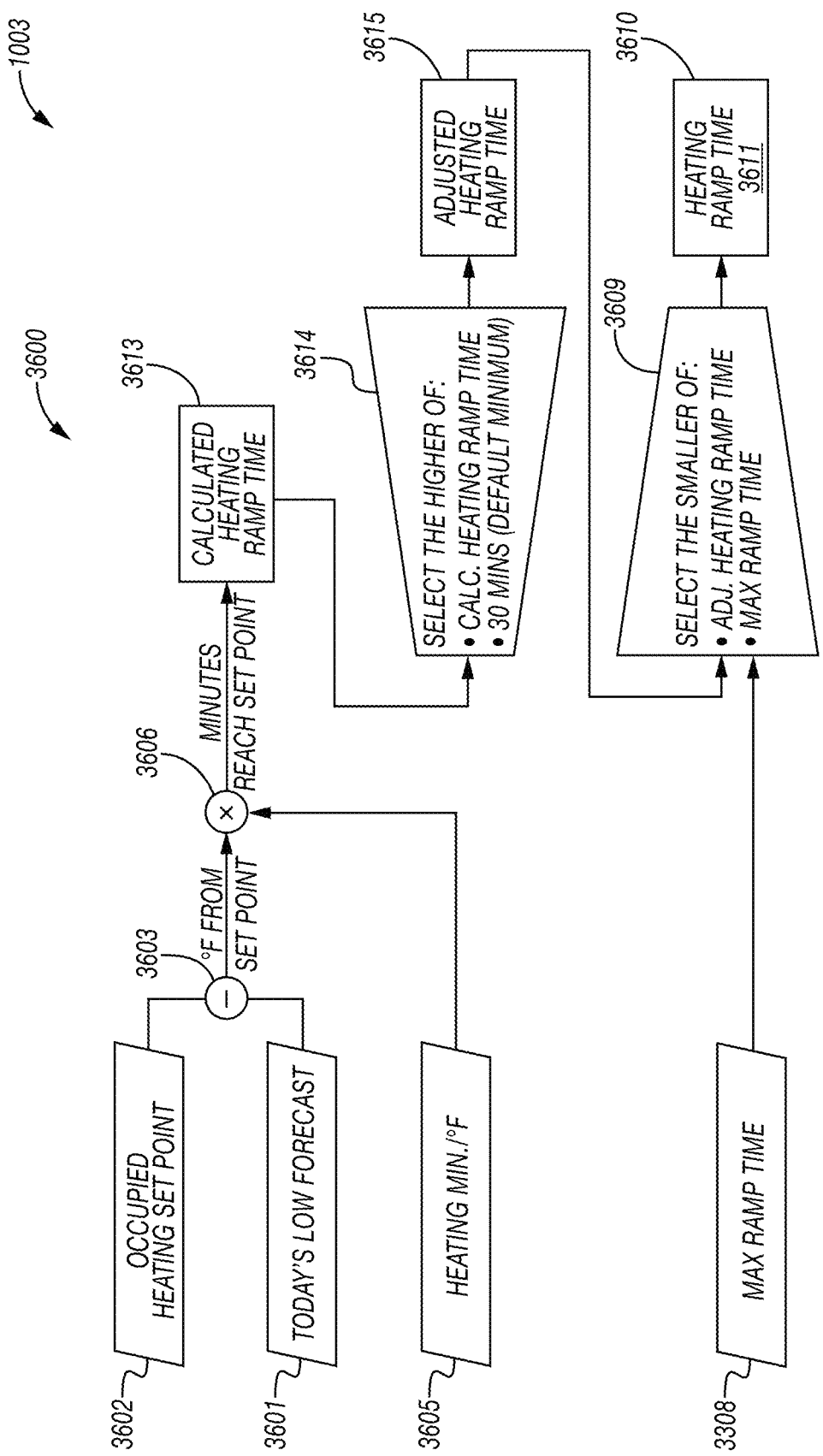
Figure 6D:
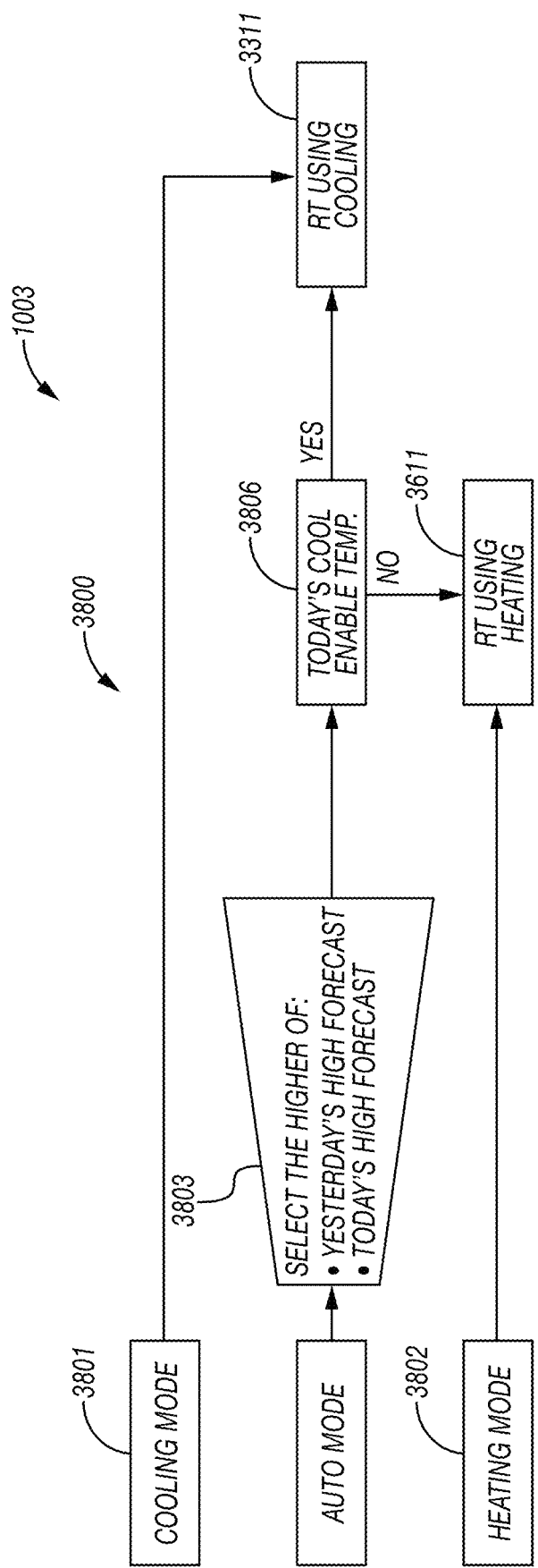

Shifting focus from FIG. 6A to also include reference to FIG. 6B-C, the method 3000 may, more specifically, contemplate a ramp time establishment procedure associated with a cooling mode (step 3008) 3300. Thus a weather responsive regime adaptation method 3500 may include a cooling mode ramp time establishment procedure 3300 comprising steps of selecting a higher of a previous day's high forecast temperature and a current day's high forecast temperature (step 3301). The cooling mode ramp time establishment procedure 3300 may include retrieving an OCSP (or OACET) from a set points table (or seasonal values table) 94 of an equipment intelligence database 54 of a static data store 18 and/or an offset from a comfort preferences database 56 of a dynamic user data store 20 (step 3302). These values may be subtracted (step 3303) to obtain a worst case forecast temperature delta from the set point of the system. A ramp time coefficient may be retrieved, such as from the equipment intelligence database 54 of the static data store 18 (and for non-limiting example, from a ramp-to-date table 92) (step 3305) and this ramp time coefficient may then by multiplied by the delta value (step 3306) to determine a calculated ramp time (step 3312). The calculated ramp time may be compared to a predetermined (and in various embodiments, user configurable) minimum ramp time, for example, 30 minutes, and the higher of the two selected (step 3313) to be the adjusted cooling ramp time (step 3307). The adjusted cooling ramp time may be a total ramp time (see step 3307) for the relevant environmental characteristic effector 10 in view of the ambient weather condition, specifically the outside air temperature that is forecast, which will affect the internal temperatures of a site and change the ramp time to get the site to an intended temperature. However, in various instances, the adjusted cooling ramp time may be excessive, for instance, in the event of an extreme or anomalous weather event outside the effective operation range of an environmental characteristic effector 10. Consequently a maximum ramp time may be retrieved from an equipment intelligence database 54 of a static data store 18 (step 3308). A selection of the smaller of the maximum ramp time and the adjusted ramp time may occur (step 3309) to prevent excessive running of the relevant environmental characteristic effector 10 and the selected value may be a final adjusted cooling ramp time 3311 propagated through aspects of the environmental control management system 3 for use by one or more environmental characteristic effector 10 (step 3310).

A similar aspect may be included for establishing a ramp time associated with a heating mode. For instance, removing focus from FIG. 6B and directing focus to FIG. 6C, the method 3000 may, more specifically, contemplate a ramp time establishment procedure associated with a heating mode (step 3007) 3300. Thus a weather responsive regime adaptation method 3500 may include a heating mode ramp time establishment procedure 3600 comprising steps of selecting a current day's low forecast temperature (step 3601). The heating mode ramp time establishment procedure 3600 may include retrieving an OHSP (or OAHET) from a set points table (or seasonal values table) 94 of an equipment intelligence database 54 of a static data store 18 and/or an offset from a comfort preferences database 56 of a dynamic user data store 20 (step 3602). These values may be subtracted (step 3603) to obtain a worst case forecast temperature delta from the set point of the system. A ramp time coefficient may be retrieved, such as from the equipment intelligence database 54 of the static data store 18 (and for non-limiting example, from a ramp-to-date table 92) (step 3605) and this ramp time coefficient may then by multiplied by the delta value (step 3606) to determine a calculated heating ramp time (step 3613). The calculated ramp time may be compared to a predetermined (and in various embodiments, user configurable) minimum ramp time, for example, 30 minutes, and the higher of the two selected (step 3614) to be the adjusted heating ramp time (step 3615). The adjusted heating ramp time may be a total ramp time (see step 3615) for the relevant environmental characteristic effector 10 in view of the ambient weather condition, specifically the outside air temperature that is forecast, which will affect the internal temperatures of a site and change the ramp time to get the site to an intended temperature. However, in various instances, the adjusted heating ramp time may be excessive, for instance, in the event of an extreme or anomalous weather event outside the effective operation range of an environmental characteristic effectors 10. Consequently a maximum ramp time may be retrieved from an equipment intelligence database 54 of a static data store 18 (step 3608). A selection of the smaller of the maximum ramp time and the adjusted ramp time may occur (step 3609) to prevent excessive running of the relevant environmental characteristic effector 10 and the selected value may be a final adjusted heating ramp time 3611 propagated through aspects of the environmental control management system 3 for use by one or more environmental characteristic effector 10 (step 3610).

Yet furthermore, a further aspect may be included for establishing a ramp time associated with an automatic mode. For instance, removing focus from FIG. 6C and directing focus to FIG. 6D, the method 3000 may, more specifically, contemplate a ramp time establishment procedure associated with an automatic mode (step 3009) 3800. Thus, a weather responsive regime adaptation method 3500 may include an automatic mode ramp time establishment procedure 3800 comprising retrieving the final adjusted cooling ramp time 3311 by performing a cooling mode ramp time establishment procedure 3300 (FIG. 6B) (step 3801) for systems operating in cooling-only mode and the final adjusted heating ramp time 3611 by performing a heating mode ramp time establishment procedure 3600 (FIG. 6C) (step 3802) for systems operating in a heating-only mode. The method may further include, for systems operating in an automatic mode, selecting a higher of a previous day's high forecast temperature and a current day's high forecast temperature (step 3803), then comparing to the selected higher temperature to an OHSP (or OAHET) (step 3806) and in response to the selected higher temperature being greater than or equal to the OHSP (or OAHET), determining that the automatic mode ramp time is set to be the final adjusted cooling ramp time 3311, and otherwise determining that the automatic mode ramp time is set to be the final adjusted heating ramp time 3611. The selected value may be a final adjusted automatic ramp time propagated through aspects of the environmental control management system 3 for use by one or more environmental characteristic effector 10.

Figure 7A:
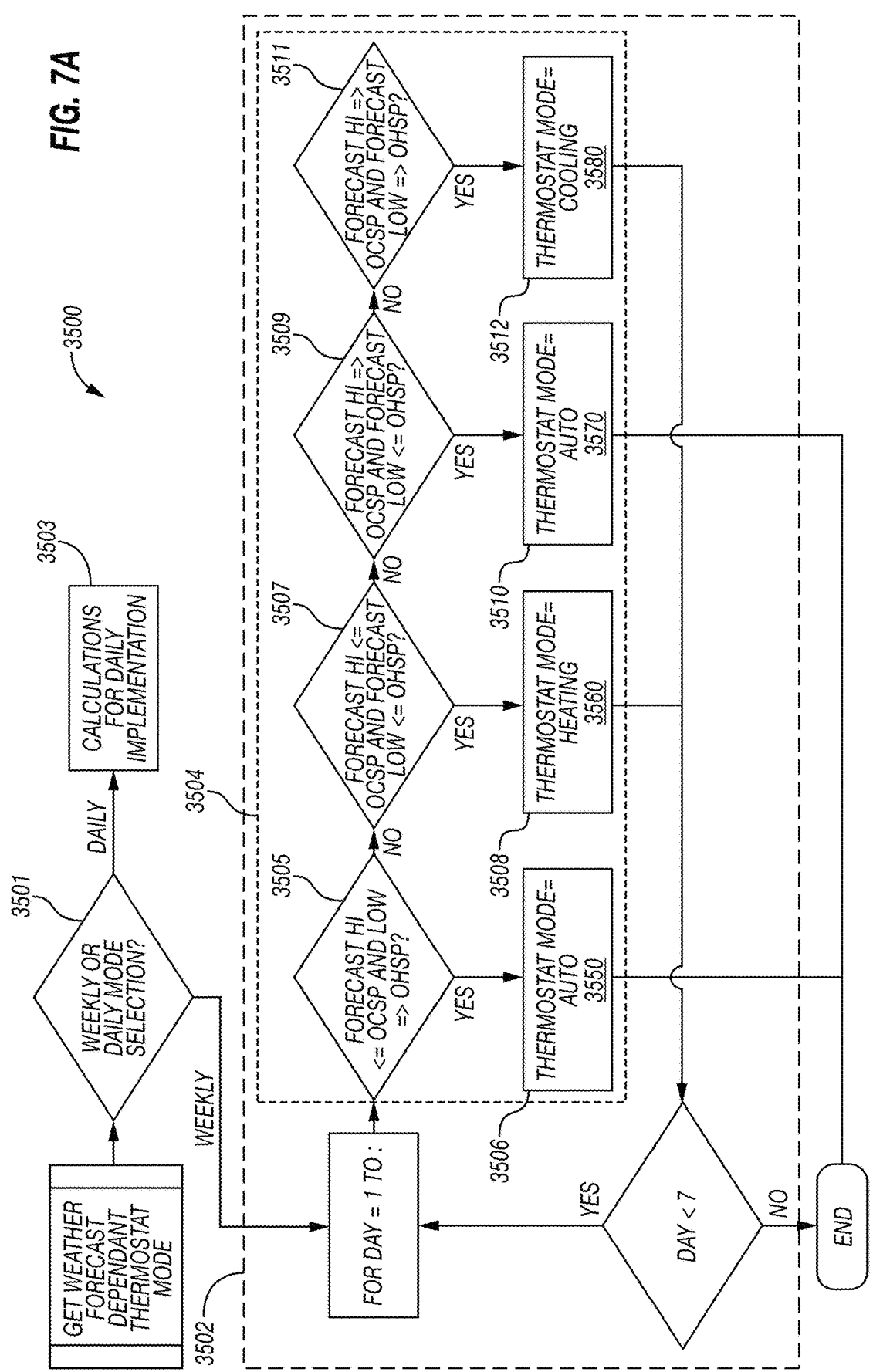
FIGS. 7A-B are diagrams depicting at least one method of weather-responsive operational regime adaptation, according to various embodiments.
Figure 7B:
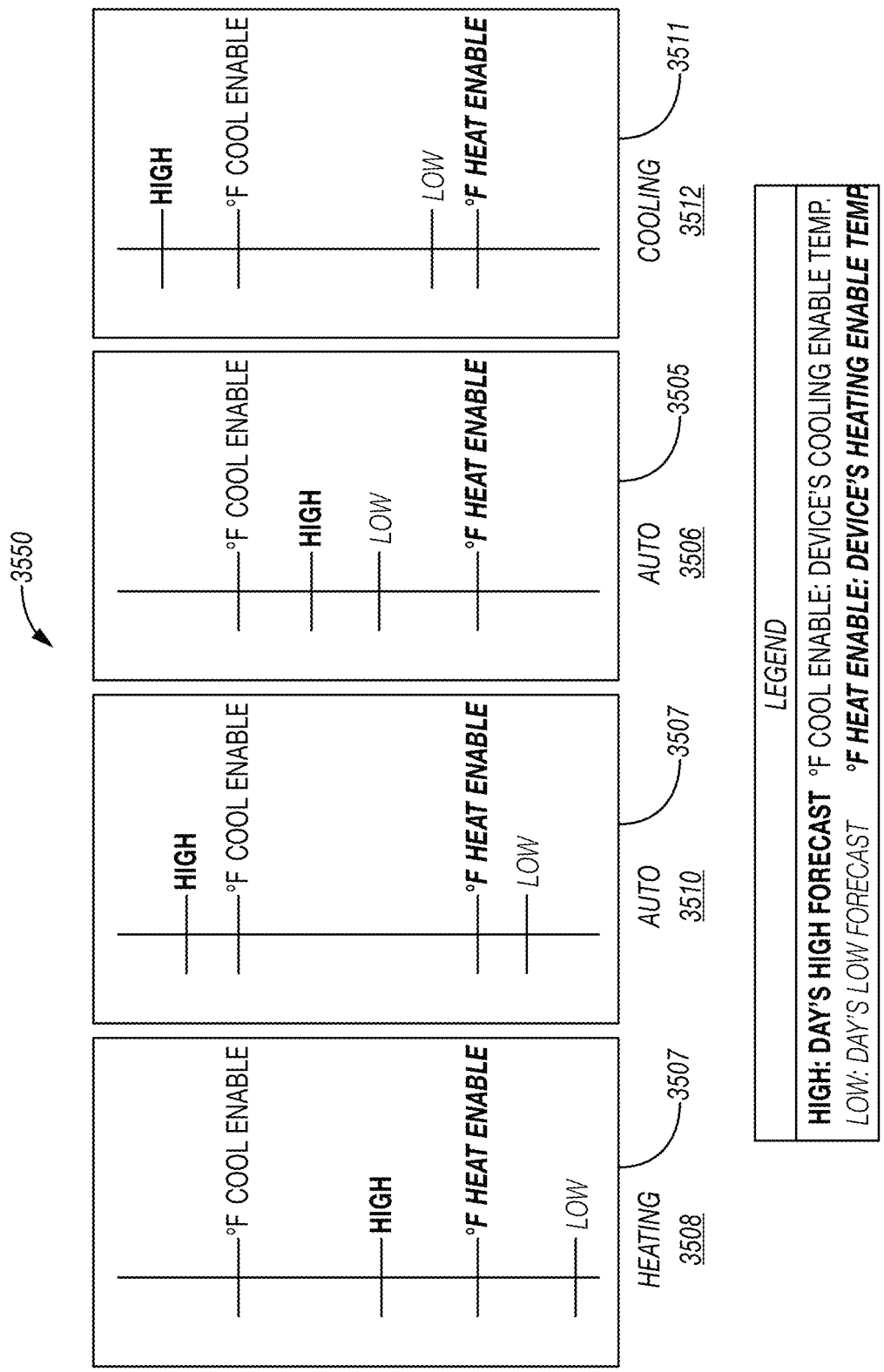
Figure 8:
FIGS. 8-24 depict an exemplary context environment including a controlled site and illustrating sensors and effectors arranged therein.
Figure 8:
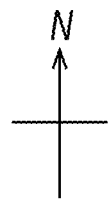
Figure 9:
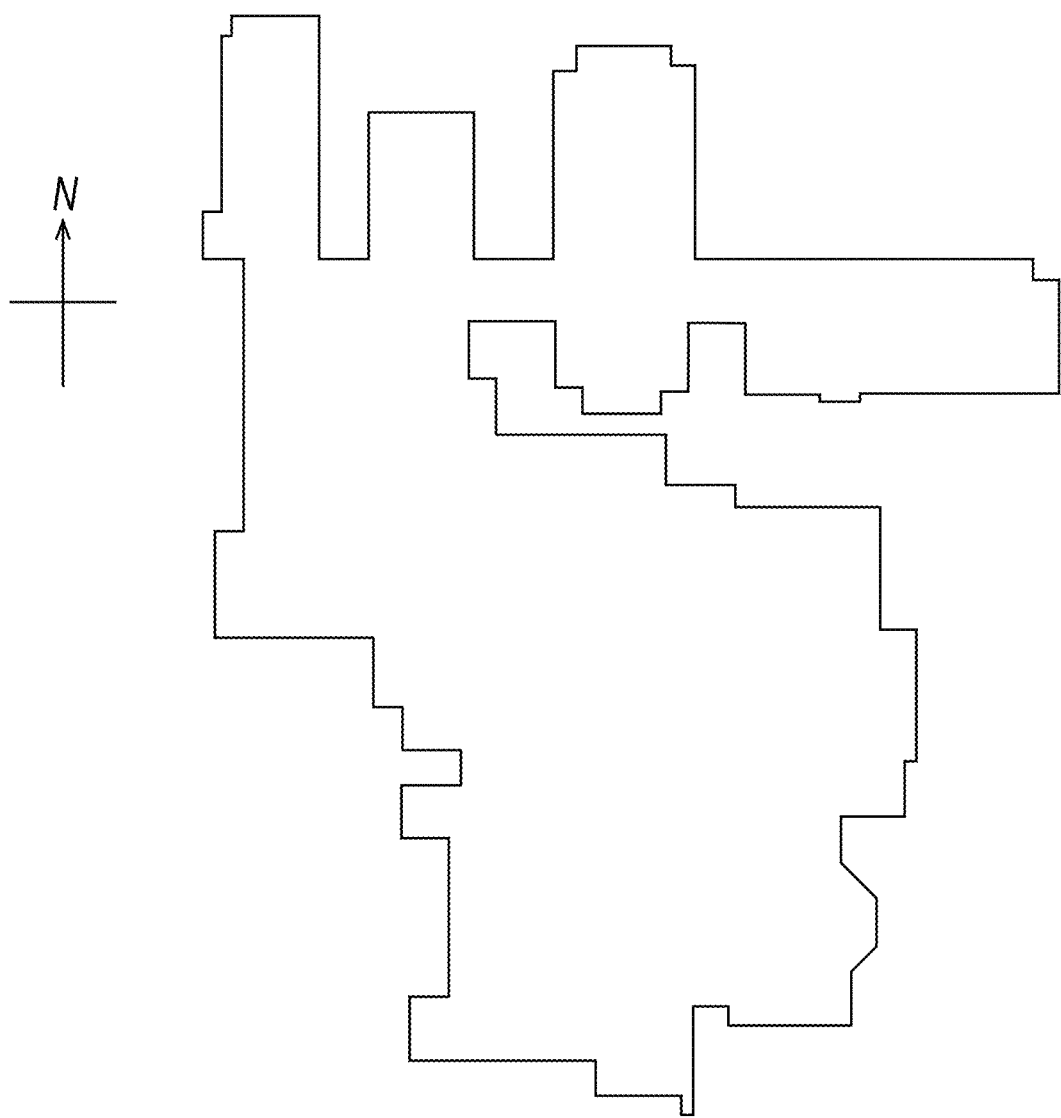
Figure 10:
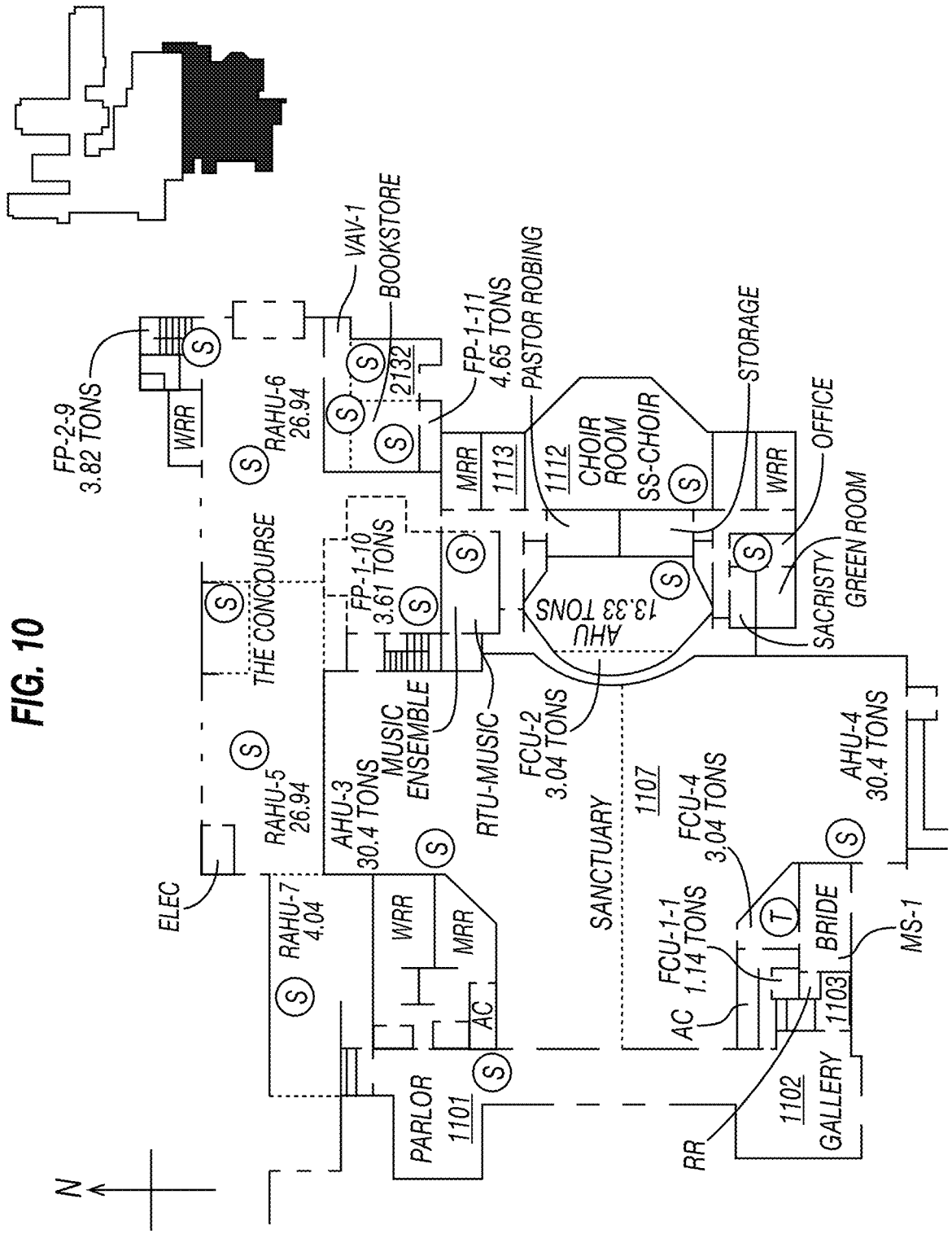
Figure 11:
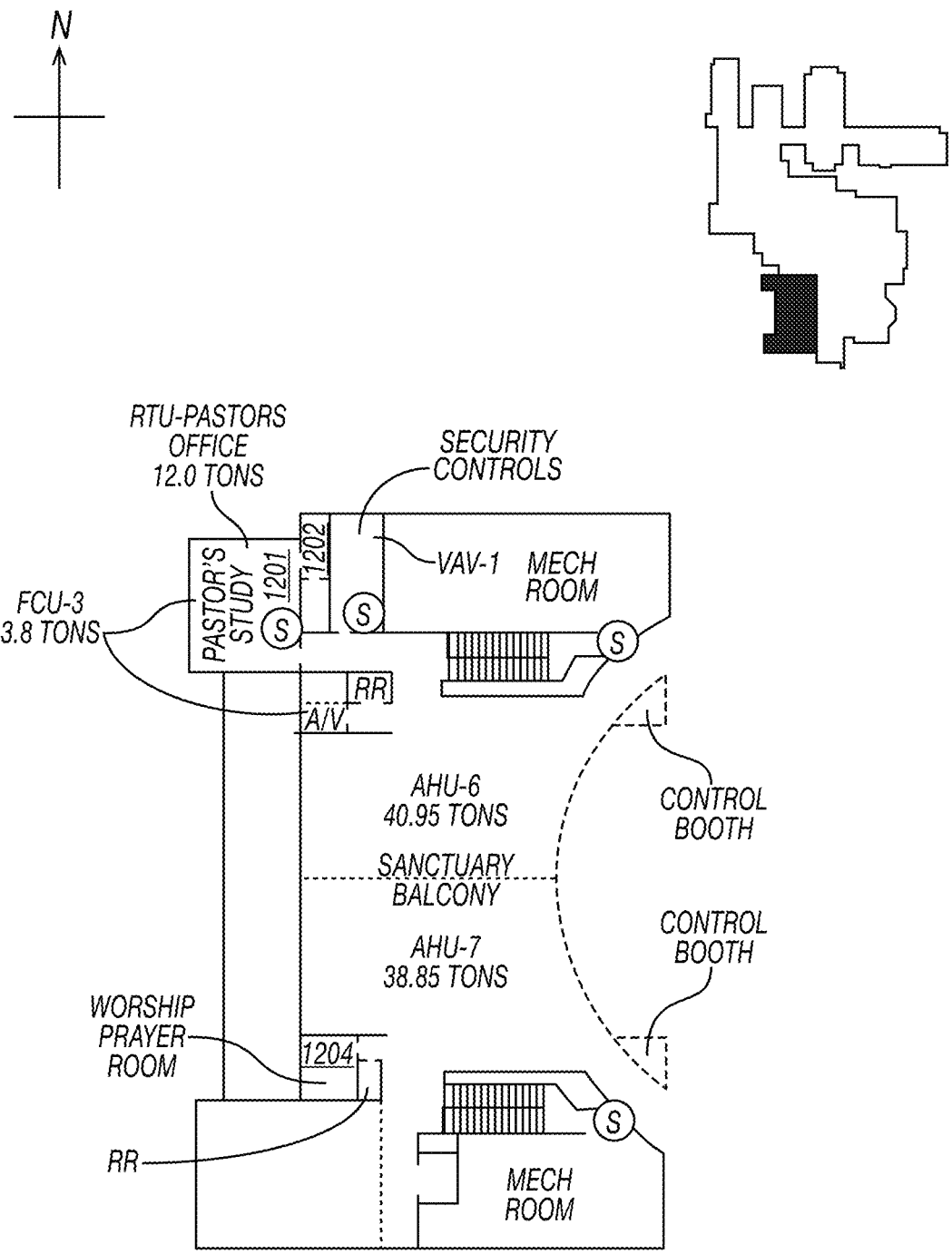
Figure 12:
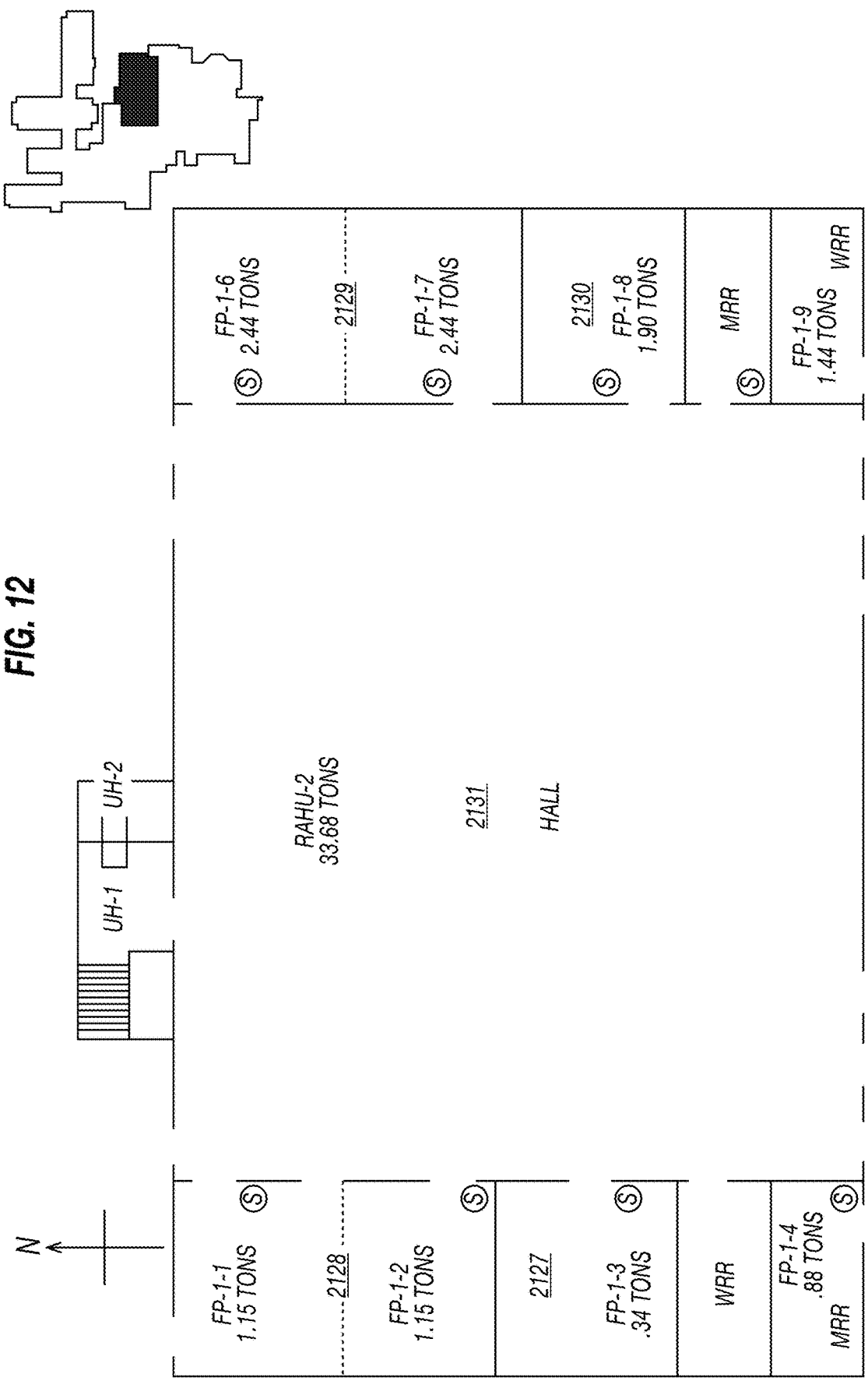
Figure 13:
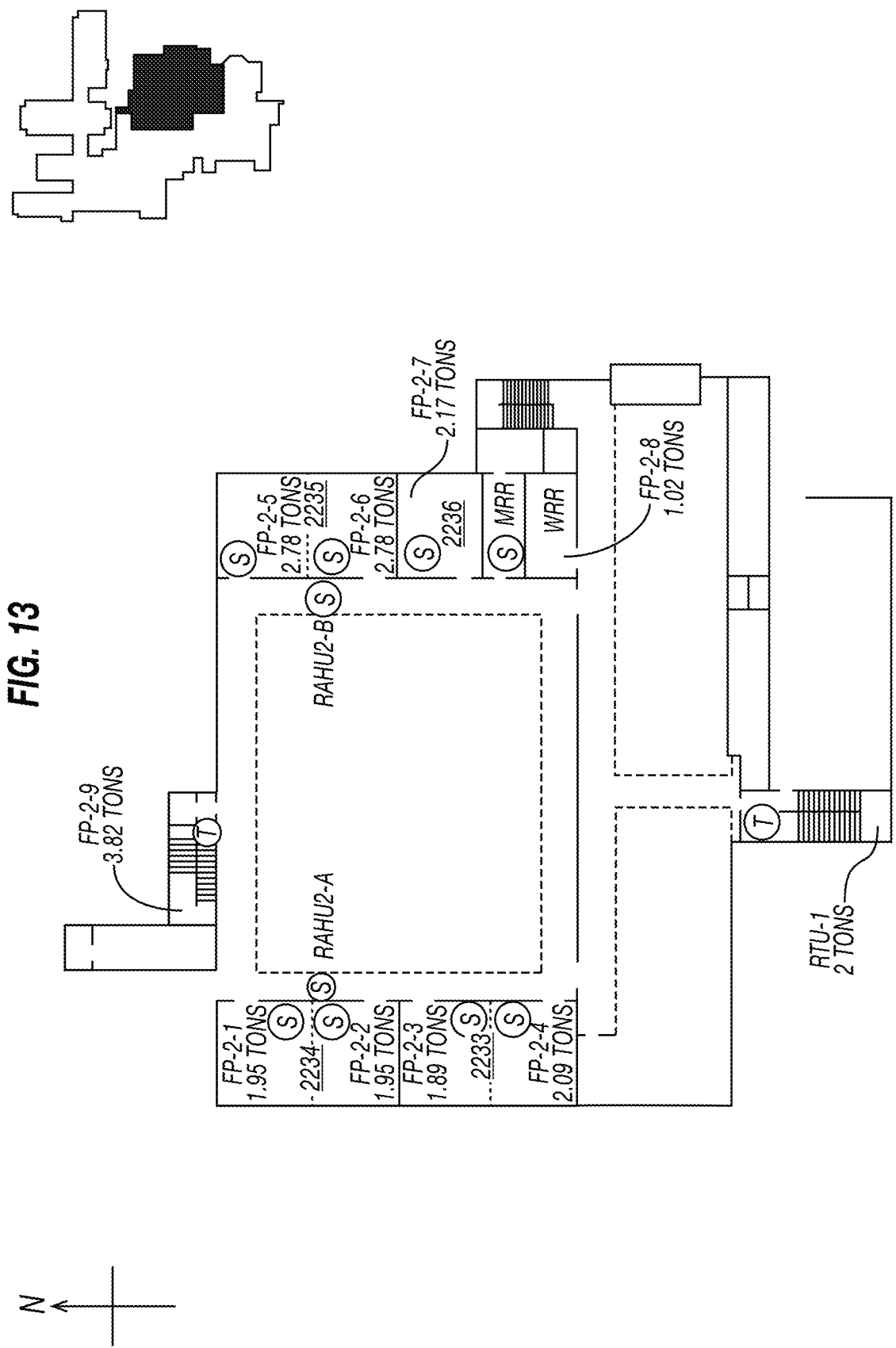
Figure 14:
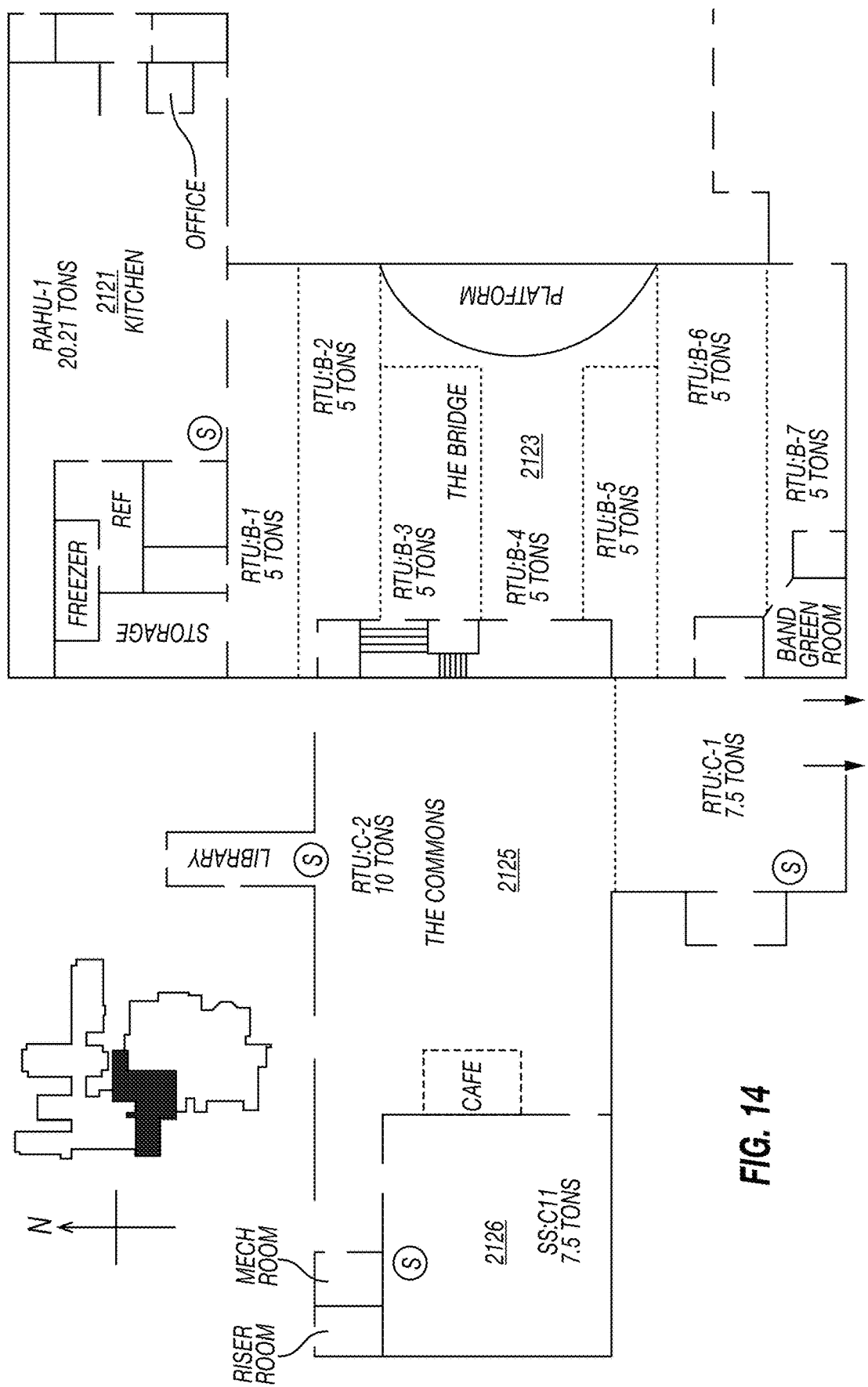
Figure 15:
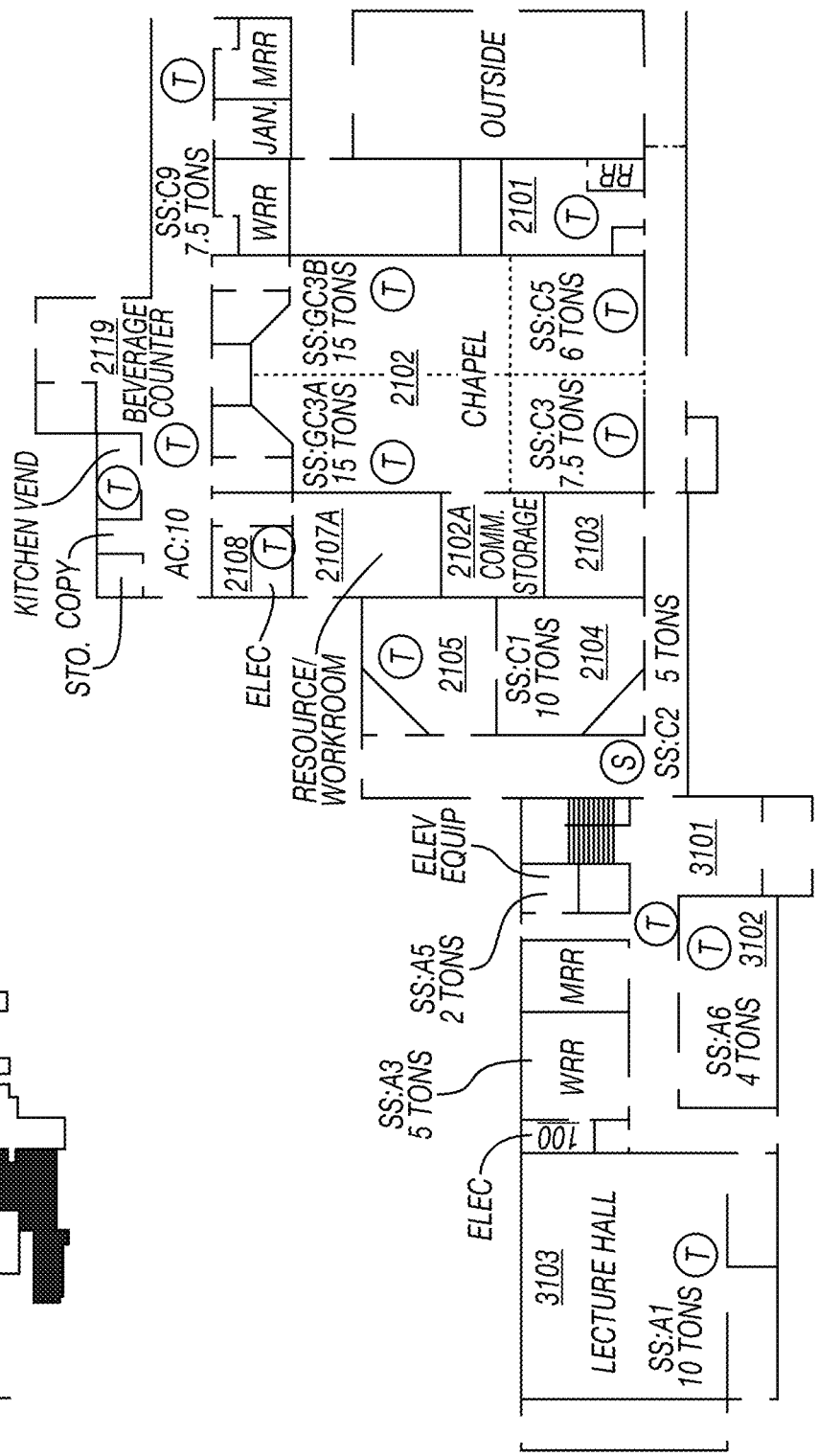
Figure 16:
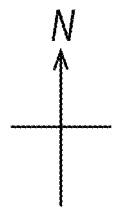
Figure 16:
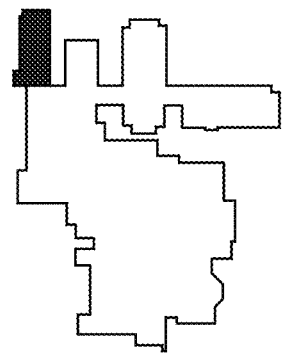
Figure 16:
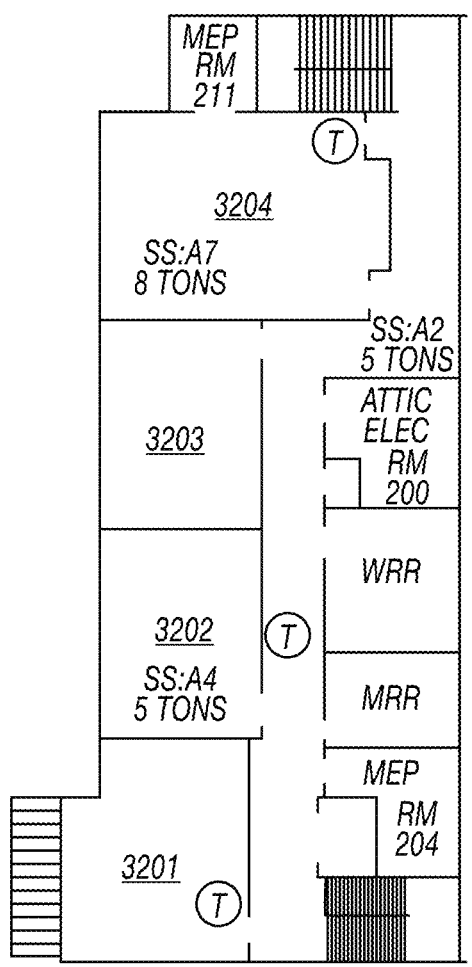
Figure 17:
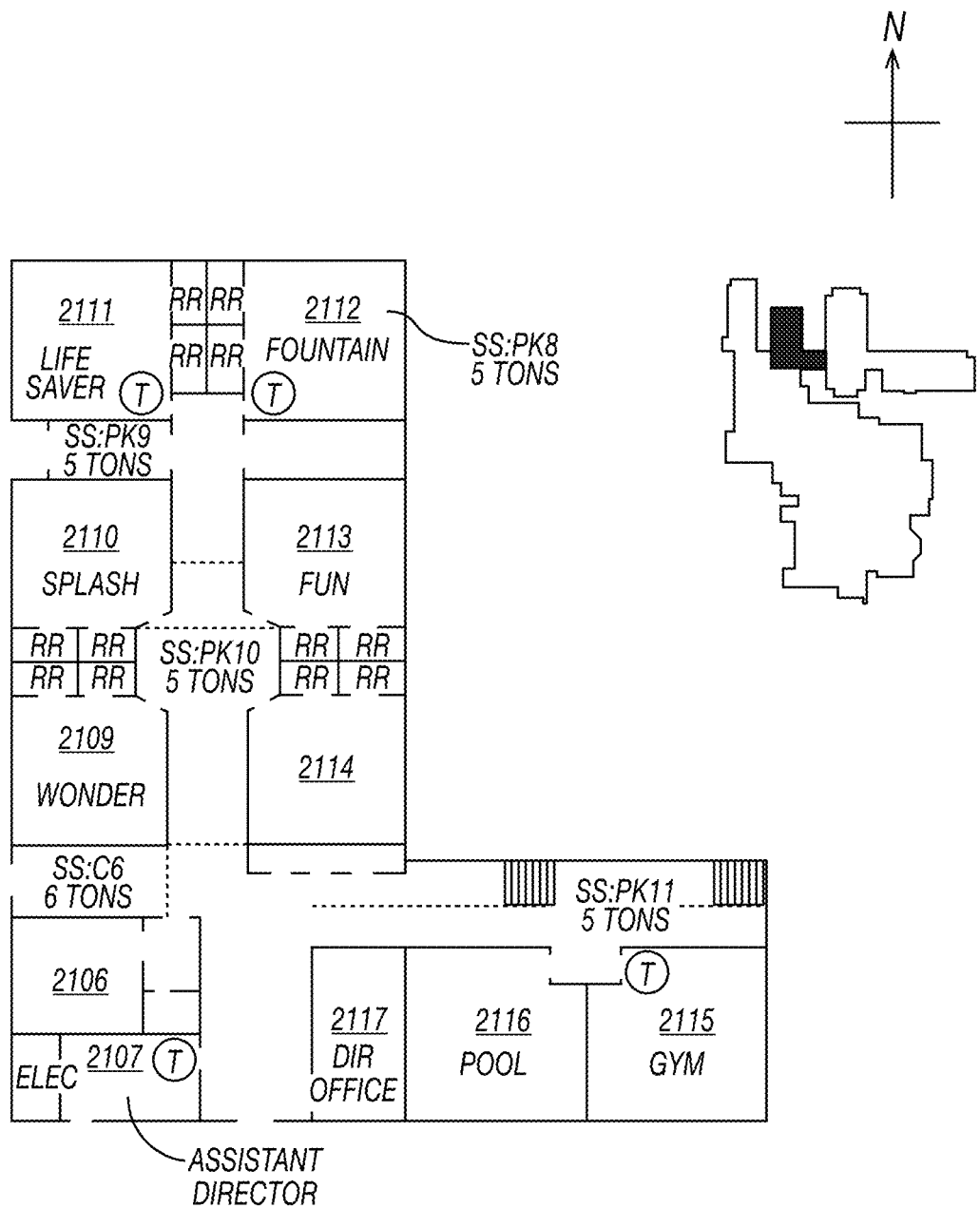
Figure 18:
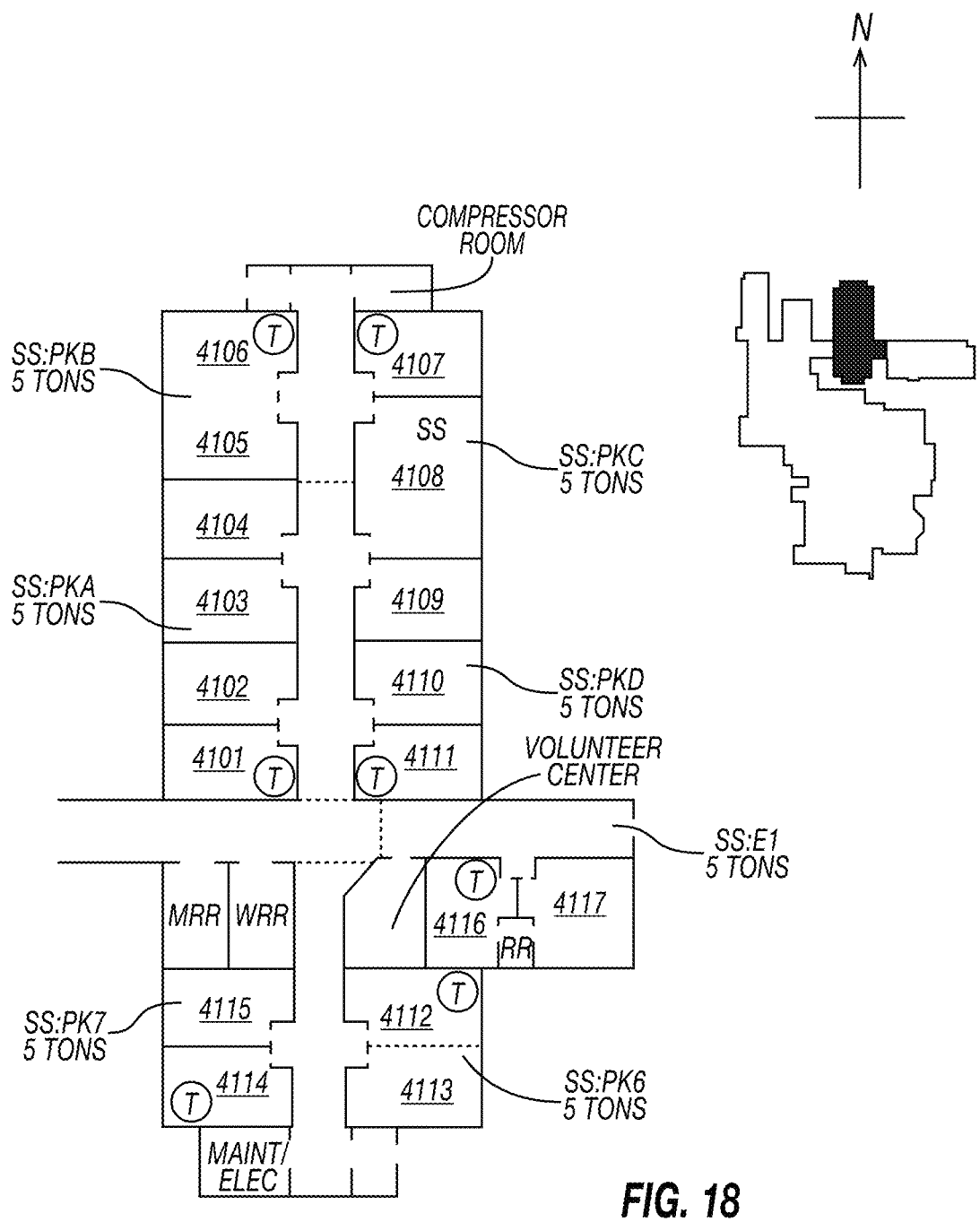
Figure 19:
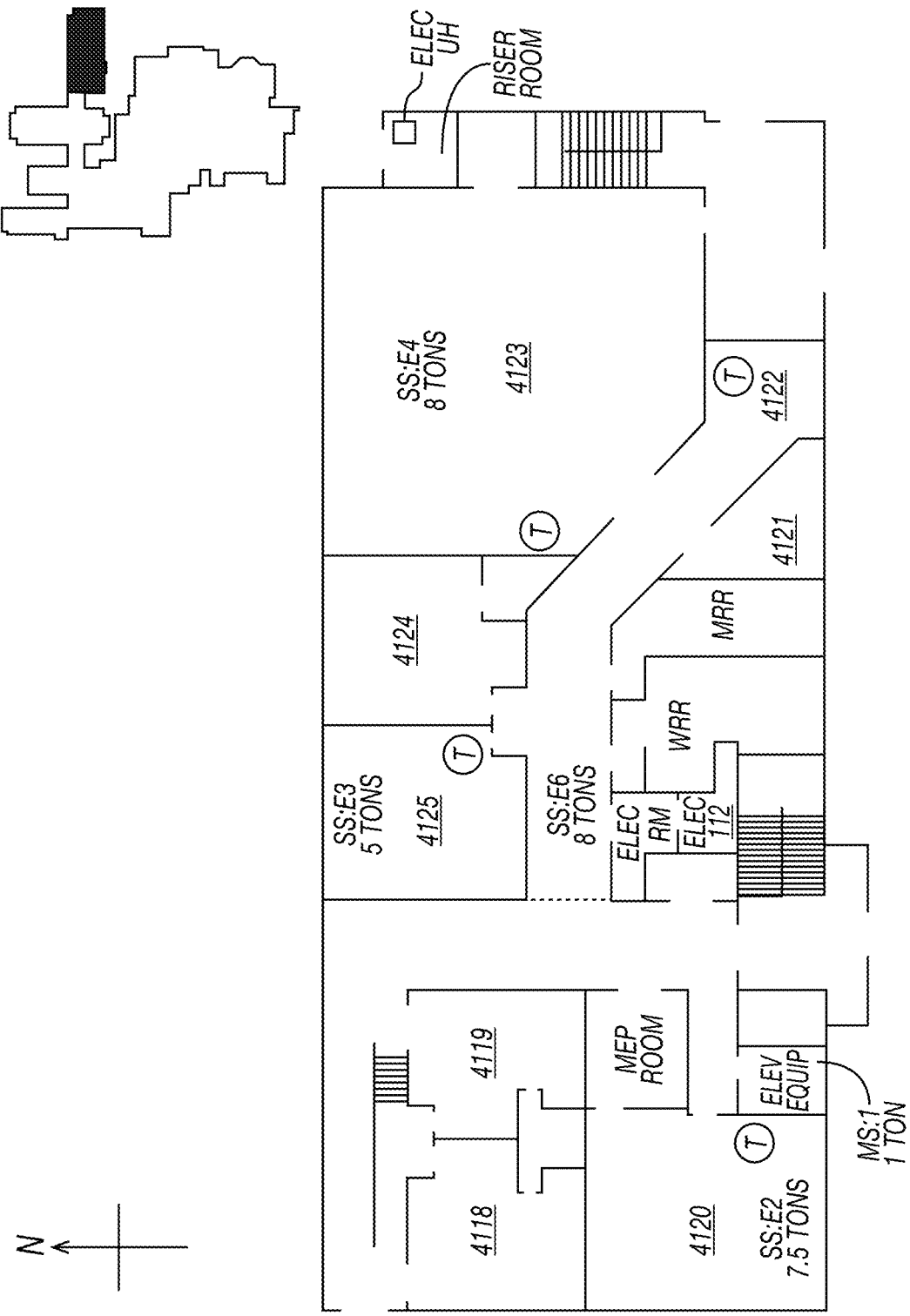
Figure 20:
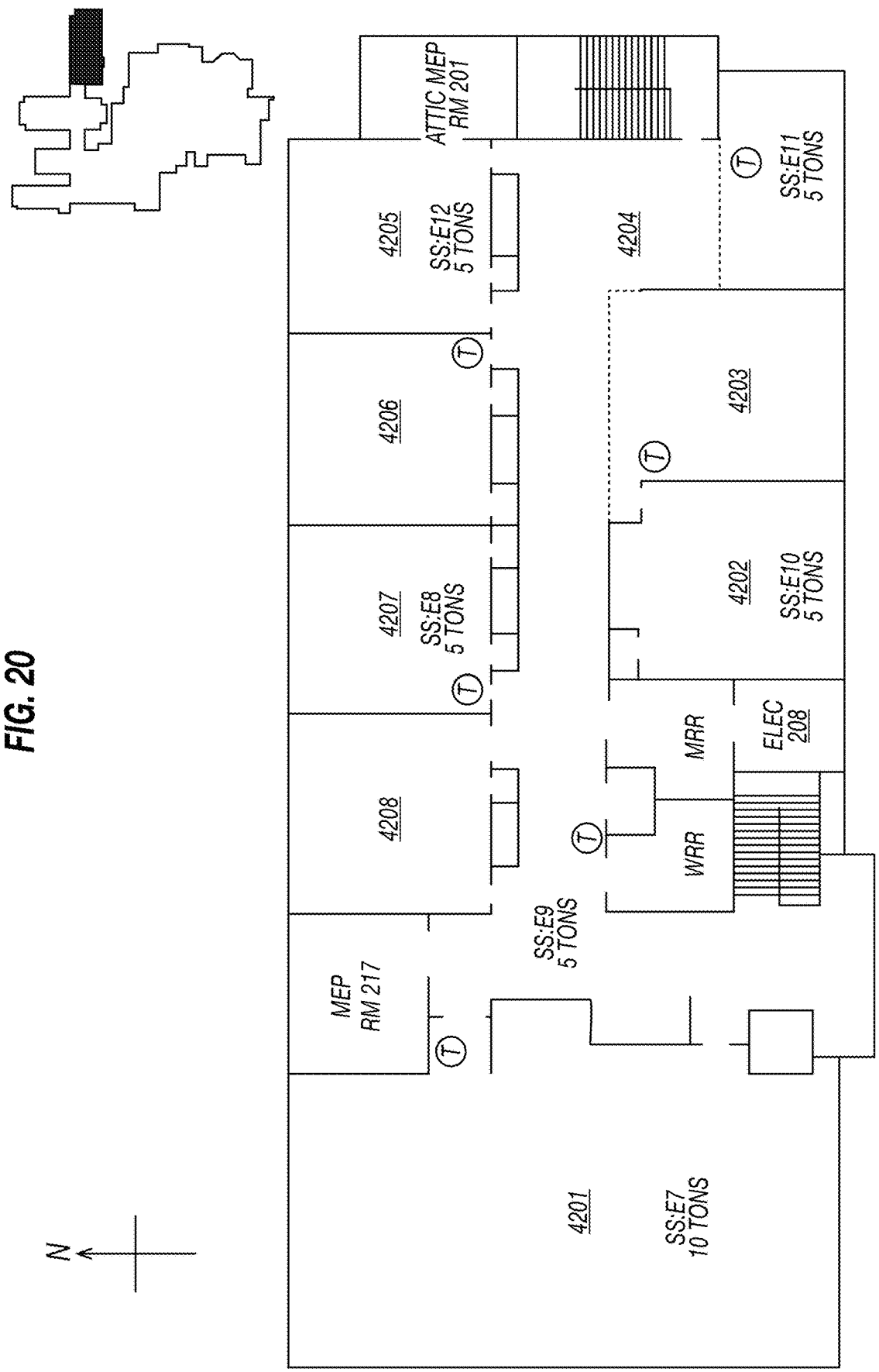
Figure 21:
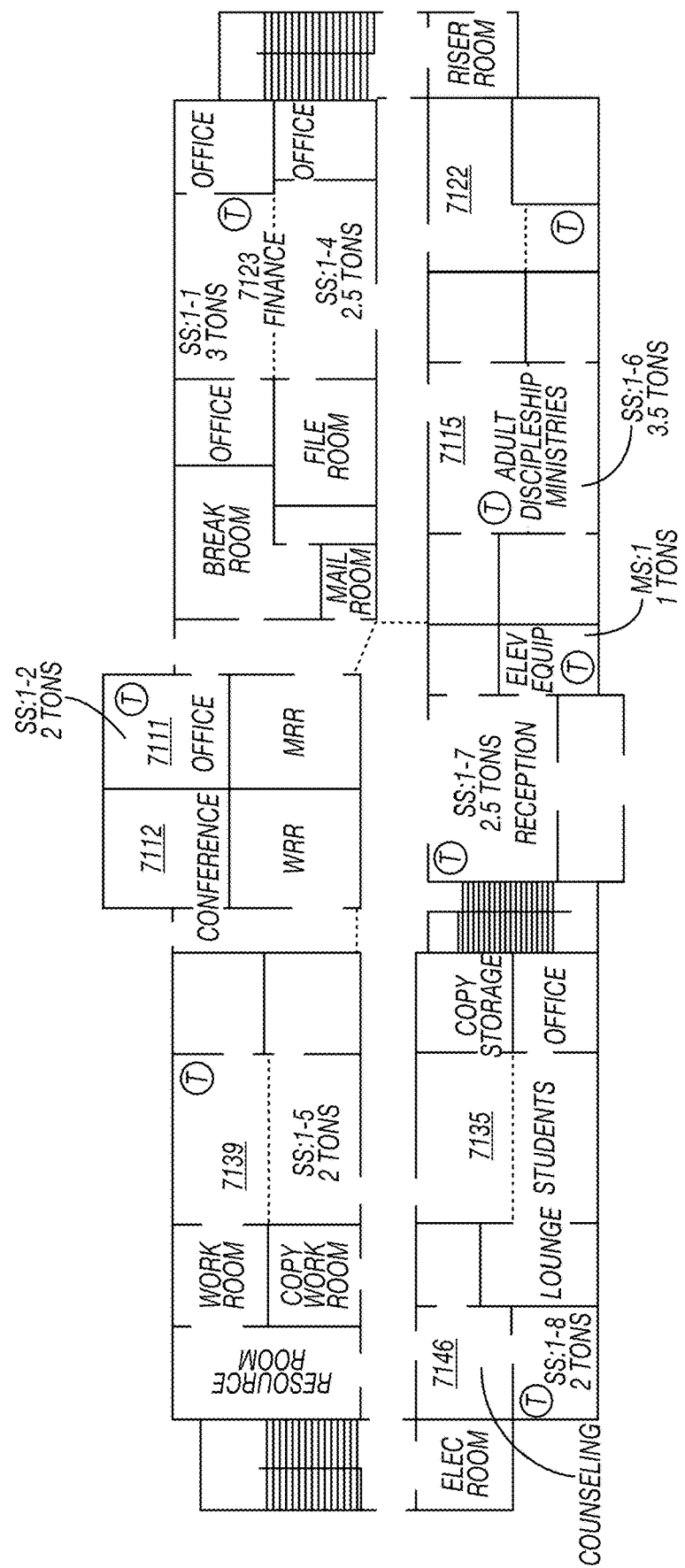
Figure 22:
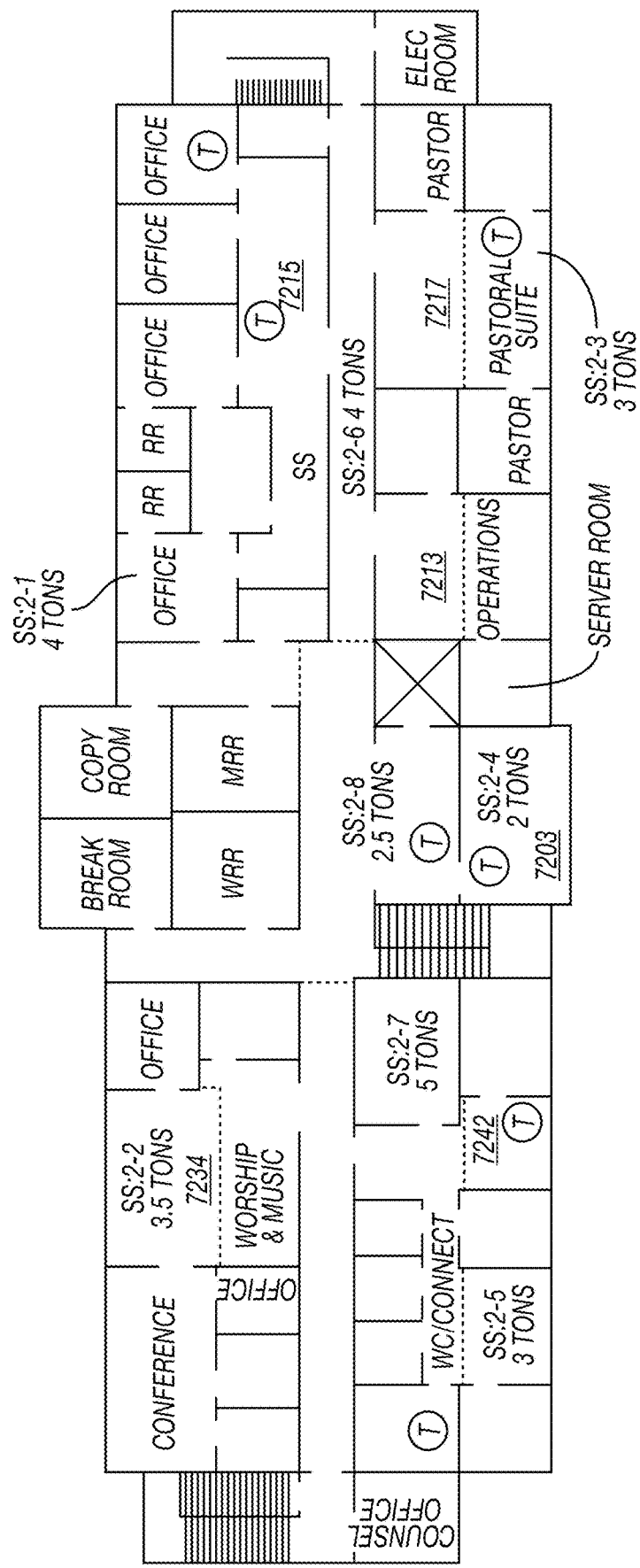
Figure 23:
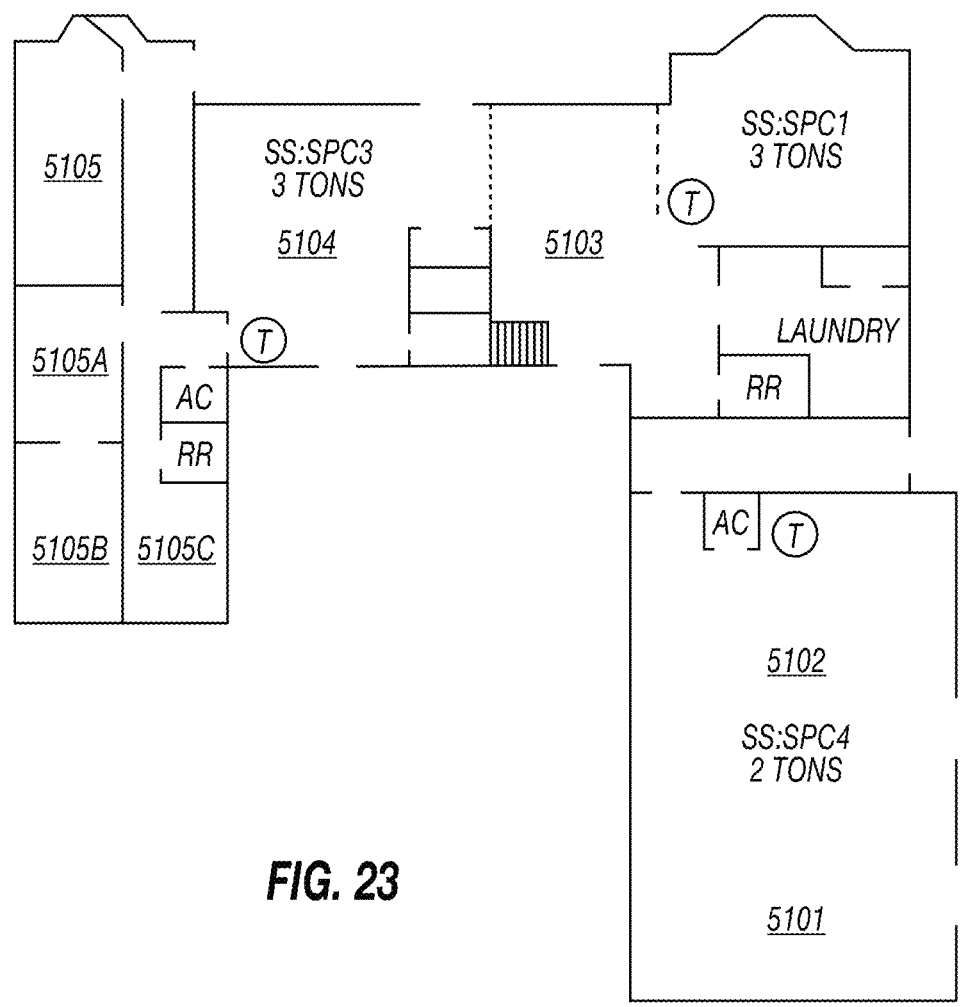
Figure 24:
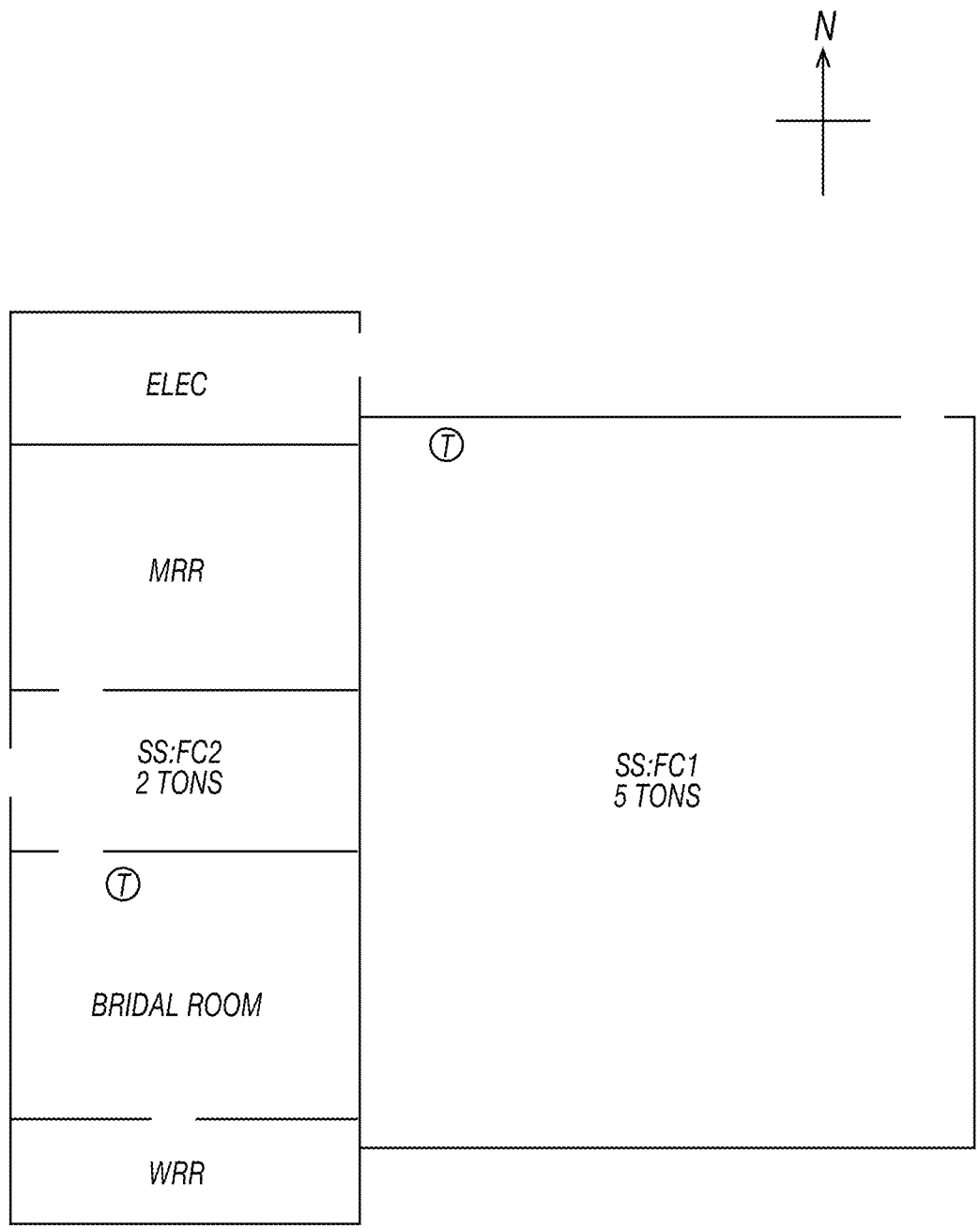

With reference now to FIGS. 1-5 and 7A-B, a weather responsive regime adaptation method 3500 is detailed more specifically. For example, an operative mode of an environmental characteristic effector 10 and/or a collection of environmental characteristic effectors 10 may be set in response to the weather. For instance, an operative mode may include a heating mode, a cooling mode, an off mode, and/or an automatic mode wherein the environmental characteristic effector 10 and/or collection of environmental characteristic effectors automatically switches between heating, cooling, and/or other modes. As shown in FIG. 7A such a method includes determining by a controller 24 whether to make a weather-responsive operational regime adaptation daily or weekly (step 3501). For instance, a seven day forecast may be reviewed and processed against an entire week (step 3502), and/or data associated with a single day may be reviewed and processed daily (step 3503). While abbreviated for simplicity, FIG. 7A depicts calculations for daily implementation 3503 as a box; however, in many instances, this aspect includes each element of step 3502, but iterated only a single time for a day. Thus, for instance, both the daily implementation (step 3503) and the weekly implementation (step 3502) may contemplate a series of parallel and/or sequential comparisons (step 3504). For instance, a forecast high temperature and a forecast low temperature for a day may be compared to an OHSP (or OAHET) and an OCSP (or OACET) temperature, and based on the relative relationships, an automatic mode, heating mode, or cooling mode may be selected. With reference to both FIGS. 7A and 7B, in response to a forecast high being less than or equal to an OCSP (or OACET) and a forecast low being greater than or equal to an OHSP (or OAHET) (step 3505), an automatic mode 3550 may be selected (step 3506). In response to a forecast high being less than or equal to an OCSP (or OACET) and a forecast low being less than or equal to an OHSP (or OAHET) (step 3507), a heating mode 3560 may be selected (step 3508). In response to a forecast high being greater than or equal to an OCSP (or OACET) and a forecast low being less than or equal to an OHSP (or OAHET) (step 3509), an automatic mode 3570 may be selected (step 3510). Finally, in response to a forecast high being greater than or equal to an OCSP (or OACET) and a forecast low being greater than or equal to an OHSP (or OAHET) (step 3511), a cooling mode 3580 may be selected (step 3511). The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

As used herein, the term "network," such as with respect to network 16 provided in FIG. 1 includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YouTube®, AppleTV®, Pandora®, xBox®, Sony® Playstation®), a uniform resource locator ("URL"), a document (e.g., a Microsoft Word® document, a Microsoft Excel® document, an Adobe .pdf document, etc.), an "ebook," an "emagazine," an application or microapplication (as described herein), an SMS or other type of text message, an email, Facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, Foursquare®, Twitter®, MySpace®, LinkedIn®, and the like. Examples of affiliate or partner websites include American Express®, Visa®, Google®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; utility company data; institution data; regulatory agency data; and/or like data useful in the operation of the system. As those skilled in the art will appreciate, user computer may include an operating system (e.g., Windows NT®, Windows 95/98/2000®, Windows XP®, Windows Vista®, Windows 7®, OS2, UNIX®, Linux®, Solaris®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as determining or selecting, which are commonly associated with mental operations performed by a human operator. No such capability of a human operator is necessary, possible, or desirable in most cases, in any of the operations described herein. Rather, the operations may be machine operations not performable by mere human activity.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, and optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs) are implemented. Implementation of the hardware state machine so as to perform the functions described herein will be apparent to persons skilled in the relevant art(s).

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://nvlpubs.nist.gov/nistpubs/Legacy/SP/nistspecialpublication800-145.pdf (last visited March 2017), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be rearranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or the like, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory, processor-readable storage media may be any available media that may be accessed by a computer. By way of example, and not limitation, such non-transitory, processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

The invention claimed is:

1. An environmental control management system configured to provide environmental control management for a plurality of controlled sites, the environmental control management system comprising:
   a static data store comprising:
      a site intelligence database comprising a meter demand target associated with meters providing power to a plurality of effectors dispersed through the plurality of controlled sites; and
      an equipment intelligence database comprising a seasonal values table comprising environmental characteristics associated with each effector of the plurality of effectors;
   a dynamic user data store comprising a calendar activity database configured to store an occupancy pattern of the plurality of controlled sites; and
   a controller configured to receive the occupancy pattern from the calendar activity database and schedule operation of each of the plurality of effectors in response to the occupancy pattern wherein scheduling operation comprises setting each of the plurality of effectors to activate for a first duration of time prior to each site associated with each effector being scheduled for occupancy, the first duration comprising a ramp time, and
   wherein the controller further comprises a run time, ramp time, and load rolling engine configured to alter the schedule by changing the first duration in response to a meter demand target whereby an electrical load associated with at least a subset of the plurality of effectors is maintained below the meter demand target, the altering comprising increasing the first duration of at least one of the plurality of effectors to cause an actuation of the at least one of the plurality of effectors to be asynchronous with a further actuation of a further at least one of the plurality of effectors.

2. The environmental control management system of claim 1, further comprising:
   a third party data receiver comprising:
      an I/O controller configured to receive weather data via a third party data receiver data input channel; and
      a weather database, wherein the I/O controller stores weather data in the weather database;
   wherein the controller further comprises a weather adaptation module configured to retrieve the weather data and interoperate with the run time, ramp time, and load rolling engine to assign the ramp time of the at least an effector of the at least the subset of the plurality of effectors, and wherein the controller is configured to further alter the schedule by changing the first duration comprising the ramp time in response to the weather data.

3. The environmental control management system according to claim 2,
wherein the third party data receiver further comprises a utility provider database comprising a billing rule and a real-time load data, and
wherein the controller is configured to alter the schedule in response to the billing rule, whereby the meter demand target of the site intelligence database is changed in response to a comparison of the real-time load data and the billing rule.

4. The environmental control management system of claim 2, wherein assigning the ramp time comprises performing a method of daily weather-responsive effector ramp time determination comprising:
obtaining a mode of a thermostat, wherein obtaining the mode of the thermostat comprises:
retrieving, by the weather database of a third party data receiver, daily weather forecast data comprising a forecast high temperature and a forecast low temperature;
retrieving, from the seasonal values table of at least one of the equipment intelligence database of the static data store, an outside air cooling enable temperature (OACET) of the thermostat;
retrieving, from the seasonal values table of at least one of the equipment intelligence database of the static data store, an outside air heating enable temperature (OAHET) of the thermostat;
comparing, by the controller, the forecast high temperature to the OACET;
comparing, by the controller, the forecast low temperature to the OAHET;
the controller configured to, in response to the forecast high temperature being less than or equal to the OACET and the forecast low temperature being greater than or equal to the OAHET, select an automatic mode for the thermostat;
the controller configured to, in response to the forecast high temperature being less than or equal to the OACET and the forecast low temperature being less than or equal to the OAHET, select a heating mode for the thermostat;
the controller configured to, in response to the forecast high temperature being greater than or equal to the OACET and the forecast low temperature being less than or equal to the OAHET, select the automatic mode for the thermostat; and
the controller configured to, in response to the forecast high temperature being greater than or equal to the OACET and the forecast low temperature being greater than or equal to the OAHET, select a cooling mode for the thermostat; and
the controller further configured to, in response to the mode of the thermostat being the cooling mode, perform, by the run time, ramp time, and load rolling engine, a cooling mode ramp time establishment procedure;
the controller further configured to, in response to the mode of the thermostat being the heating mode, perform, by the run time, ramp time, and load rolling engine, a heating mode ramp time establishment procedure; and
the controller further configured to, in response to the mode of the thermostat being the automatic mode, perform, by the run time, ramp time, and load rolling engine, an automatic mode ramp time establishment procedure.

5. The environmental control management system of claim 4, further comprising wherein the heating mode ramp time establishment procedure performed by the run time, ramp time, and load rolling engine of the controller comprises:
retrieving, from the weather database by the weather adaptation module, a current day's low forecast temperature;
retrieving, from the seasonal values table of the equipment intelligence database of the static data store, an OAHET;
differencing, by the controller, the current day's low forecast temperature with the OAHET to obtain a worst case forecast temperature delta;
retrieving, from the equipment intelligence database of the static data store, a ramp time coefficient;
multiplying the ramp time coefficient by the worst case forecast temperature delta to determine a calculated heating ramp time;
comparing the calculated heating ramp time to a minimum ramp time and selecting a larger of the calculated heating time and the minimum ramp time as an adjusted heating ramp time; retrieving, from the equipment intelligence database of the static data store, a maximum ramp time;
selecting, by the controller, a smaller of the maximum ramp time and the adjusted heating ramp time as a final adjusted heating ramp time; and
changing the first duration by propagating, by the controller, the final adjusted heating ramp time to at least one of a central plant and the effector connected to the thermostat.

6. The environmental control management system of claim 4, further comprising wherein the cooling mode ramp time establishment procedure performed by the run time, ramp time, and load rolling engine of the controller comprises:
retrieving, from the weather database by the weather adaptation module, a previous day's high forecast temperature and a current day's high forecast temperature and selecting, by the controller, a higher of the previous day's high forecast temperature and the current day's high forecast temperature;
retrieving, from the seasonal values table of the equipment intelligence database of the static data store, an OACET;
differencing the higher of the previous day's high forecast temperature and the current day's high forecast temperature with the OACET to obtain a worst case forecast temperature delta;
retrieving, from the equipment intelligence database of the static data store, a ramp time coefficient;
multiplying, by the controller, the ramp time coefficient by the worst case forecast temperature delta to determine a calculated cooling ramp time;
comparing the calculated cooling ramp time to a minimum ramp time and selecting a larger of the calculated cooling ramp time and the minimum ramp time as an adjusted cooling ramp time;
retrieving, from the equipment intelligence database of the static data store, a maximum ramp time; and
selecting, by the controller, a smaller of the maximum ramp time and the adjusted cooling ramp time as a final adjusted cooling ramp time;

changing the first duration by propagating, by the controller, the final adjusted cooling ramp time to at least one of a central plant and the effector connected to the thermostat.

7. The environmental control management system of claim 4, further comprising wherein the automatic mode ramp time establishment procedure performed by the run time, ramp time, and load rolling engine of the controller comprises:
retrieving, by the controller, a final adjusted cooling ramp time by performing the cooling mode ramp time establishment procedure;
retrieving, by the controller, a final adjusted heating ramp time by performing the heating mode ramp time establishment procedure; and
selecting a higher of a previous day's high forecast temperature and a current day's high forecast temperature;
comparing the selected higher temperature to the OAHET;
in response to the selected higher temperature being greater than or equal to the OAHET selecting the final adjusted heating ramp time as a final adjusted automatic ramp time;
in response to the selected higher temperature being less than the OAHET selecting the final adjusted cooling ramp time as a final adjusted automatic ramp time; and
changing the first duration by propagating, by the controller, the final adjusted automatic ramp time to at least one of a central plant and the effector connected to the thermostat.

8. The environmental control management system of claim 4, further comprising wherein the scheduling the operation of each of the plurality of effectors in response to the occupancy pattern further comprises:
importing, by the controller, data representative of a calendar containing a plurality of calendar events, by a calendar activity engine of the controller, wherein the data comprises at least one of dates, times, use types, and rooms;
assigning, by the run time, ramp time, and load rolling engine of the controller, the first duration comprising the ramp time to each calendar event; and
instructing, by the controller, the effector to actuate in response to the ramp time assigned to the calendar event,
wherein actuating comprises at least one of turning on and turning off.

9. The environmental control management system of claim 8, further comprising wherein the scheduling the operation of each of the plurality of effectors in response to the occupancy pattern further comprises:
calculating, by the calendar activity engine, an event proximity window comprising a determined duration of time wherein events spaced apart by no less than the event proximity window are mergeable as a single event;
merging, by the calendar activity engine, at least two calendar events of the plurality of calendar events, in response to the at least two calendar events occupying time slots lying within the event proximity window;
identifying, by an equipment intelligence engine of the controller, at least one effector of the plurality of effectors of the environmental control management system, wherein the at least one effector is associated with the site of the calendar event;
determining, by the equipment intelligence engine of the controller, whether at least one further effector of the plurality of effectors of the environmental control management system has a central plant-peripheral unit relationship wherein the further effector is associated with a central plant shared with the at least one effector;
in response to the determining indicating that the effector and the further effector each have central plant-peripheral unit relationships with the central plant, aggregating a load of the effector and the further effector to calculate an aggregated plant load; and
in response to the determining indicating that the aggregated plant load is less than a central plant minimum load requirement, selecting by the controller a second further effector for actuating and instructing, by the controller the second further effector to actuate.

10. The environmental control management system of claim 9, further comprising wherein the scheduling the operation of each of the plurality of effectors in response to the occupancy pattern further comprises:
identifying, by a site intelligence engine and effector mapping engine, a meter associated with the effector;
evaluating a meter charge profile associated with the meter and stored in the site intelligence database by the site intelligence engine and determining an existence of a demand charge of the meter charge profile; and
performing a load rolling method in response to the existence of the demand charge, wherein the load rolling method returns a timeslot precession instruction; and
subsequent to the performing the load rolling method, setting an operating time of at least one of the at least one effector and the central plant in response to the timeslot precession instruction.

* * * * *